(12) United States Patent
Takamura et al.

(10) Patent No.: US 6,430,484 B1
(45) Date of Patent: Aug. 6, 2002

(54) VEHICLE WHEEL INFORMATION SUPPLY DEVICE WHICH SUPPLIES SMALLER DATA SET EARLIER THAN LARGER DATA SET

(75) Inventors: Yoshinori Takamura, Toyota; Akihiro Taguchi, Kariya, both of (JP)

(73) Assignees: Toyota Jidosha Kabushiki Kaisha, Toyota; Denso Corporation, Kariya, both of (JP)

(*) Notice: Subject to any disclaimer, the term of this patent is extended or adjusted under 35 U.S.C. 154(b) by 0 days.

(21) Appl. No.: 09/678,320

(22) Filed: Oct. 3, 2000

(30) Foreign Application Priority Data

Oct. 6, 1999 (JP) ............................. 11-285102

(51) Int. Cl.[7] ..................... B60C 23/00; G01L 17/00
(52) U.S. Cl. ..................... 701/29; 701/30; 340/447
(58) Field of Search ..................... 701/29, 30, 35; 340/442, 445, 447, 449; 73/146.4, 146.5

(56) References Cited

U.S. PATENT DOCUMENTS

| | | | | |
|---|---|---|---|---|
| 4,703,650 A | * | 11/1987 | Dosjoub et al. | 73/146.5 |
| 4,909,074 A | * | 3/1990 | Gerresheim et al. | 73/146.4 |
| 5,231,872 A | * | 8/1993 | Bowler et al. | 73/146.5 |
| 5,473,938 A | * | 12/1995 | Handfield et al. | 73/146.5 |
| 5,541,574 A | * | 7/1996 | Lowe et al. | 340/447 |
| 5,581,023 A | * | 12/1996 | Handfield et al. | 73/146.5 |
| 5,585,554 A | * | 12/1996 | Handfield et al. | 73/146.5 |
| 5,600,301 A | | 2/1997 | Robinson, III | 340/442 |
| 5,602,524 A | | 2/1997 | Mock et al. | 340/447 |
| 5,717,376 A | | 2/1998 | Wilson | 340/442 |
| 5,774,048 A | | 6/1998 | Achterholt | 340/447 |
| 5,825,286 A | * | 10/1998 | Coulthard | 340/447 |
| 6,259,360 B1 | | 7/2001 | Takamura et al. | 340/445 |
| 6,275,148 B1 | | 8/2001 | Takamura et al. | 340/445 |

FOREIGN PATENT DOCUMENTS

| | | |
|---|---|---|
| JP | U 5-13802 | 2/1993 |
| JP | A 8-507735 | 8/1996 |
| JP | A 8-227492 | 9/1996 |
| JP | A 10-504783 | 5/1998 |
| JP | A 10-508264 | 8/1998 |

* cited by examiner

Primary Examiner—Tan Nguyen
(74) Attorney, Agent, or Firm—Oliff & Berridge, PLC

(57) ABSTRACT

A vehicle wheel information supply device disposed on a wheel of a vehicle and supplying wheel information representative of a state of the wheel, to a receiver disposed on a body of the vehicle. The vehicle wheel information supply device is capable of successively supplying a plurality of wheel data sets, as the wheel information, which represent the state of the wheel at the same point of time and which have respective data volumes different from each other, wherein the vehicle wheel information supply device supplies the plurality of wheel data sets to the receiver in a predetermined order such that a smallest one of the wheel data sets whose data volume is the smallest among the wheel data sets is supplied earlier than the other of the wheel data sets.

24 Claims, 11 Drawing Sheets

FIG. 4
(a) WAKING-UP MODE
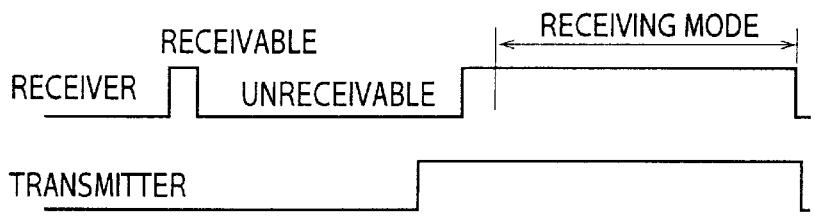
(b) WAKING-UP MODE→RECEIVING MODE
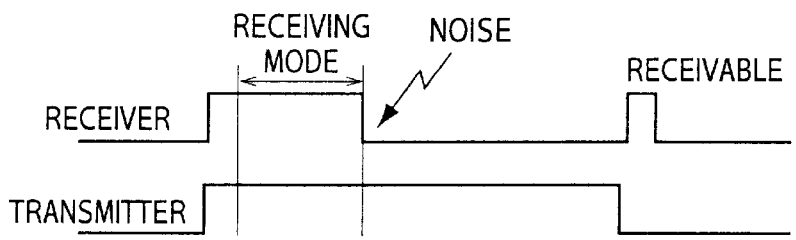
(c) RECEIVING MODE→WAKING-UP MODE
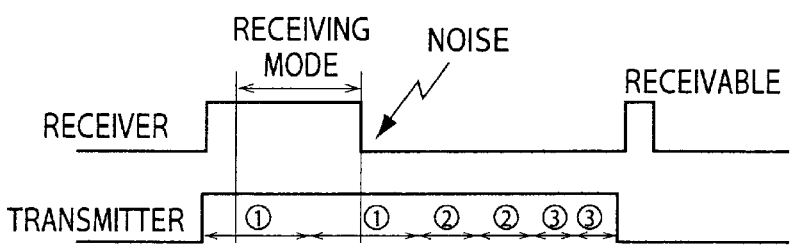
(d) TRANSMITTING LARGER DATA SET EARLIER THAN SMALLER DATA SET
① : DETAILED WHEEL DATA SET 40
② : STANDARD WHEEL DATA SET 42
③ : ABRIDGED WHEEL DATA SET 44
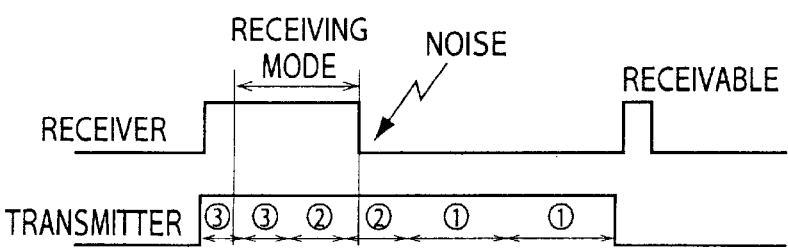
(e) TRANSMITTING SMALLER DATA SET EARLIER THAN LARGER DATA SER

FIG. 7
SYNCHRONIZATION DATA: A
COMPLEMENTARY-RELATION FLAG DATA: 0,1
TRAILER DATA: X
CHECK SUM DATA: Y
OTHER DATA: B,C,D,E,F,G,···
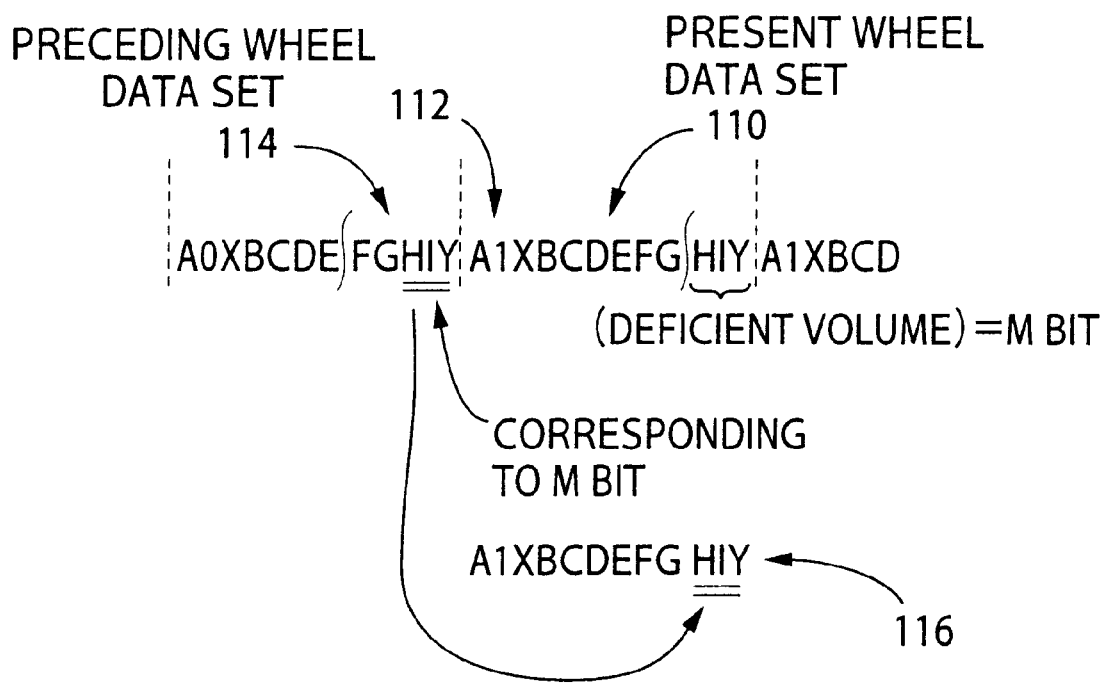
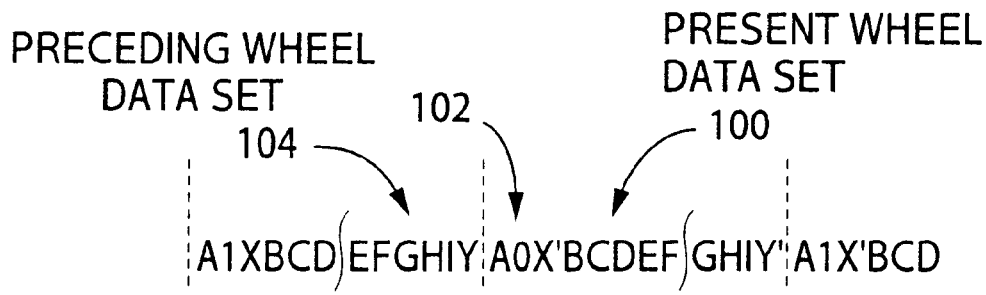

FIG. 10
SYNCHRONIZATION DATA:A
COMPLEMENTARY-RELATION FLAG DATA:0,1
TRAILER DATA:X
CHECK SUM DATA:Y
OTHER DATA:B,C,D,E,F,G,···
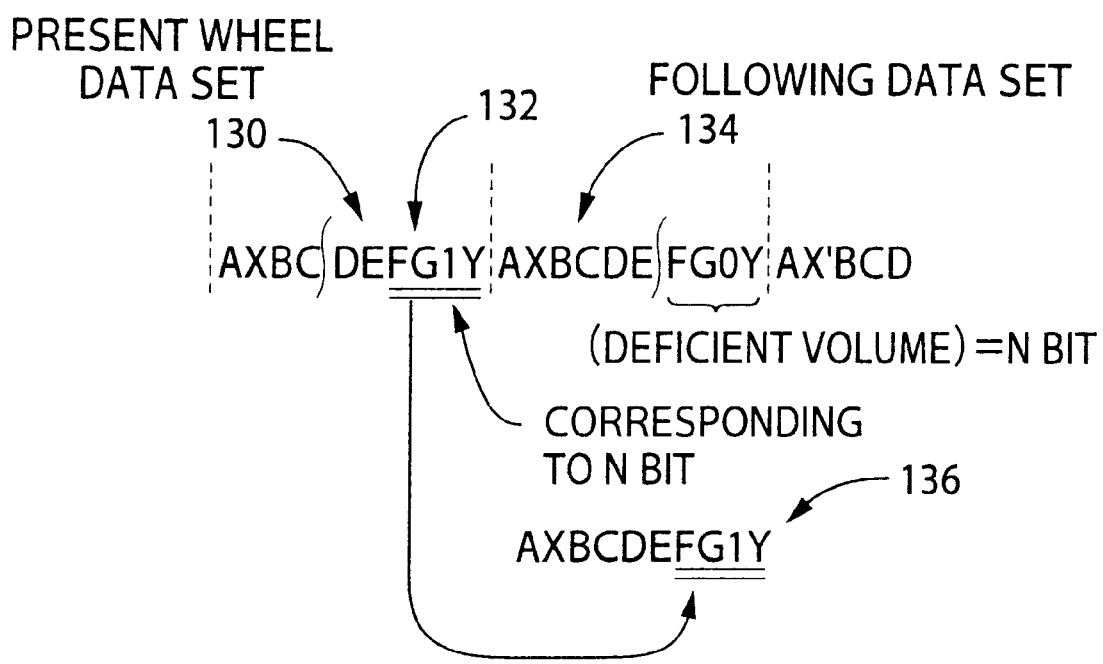
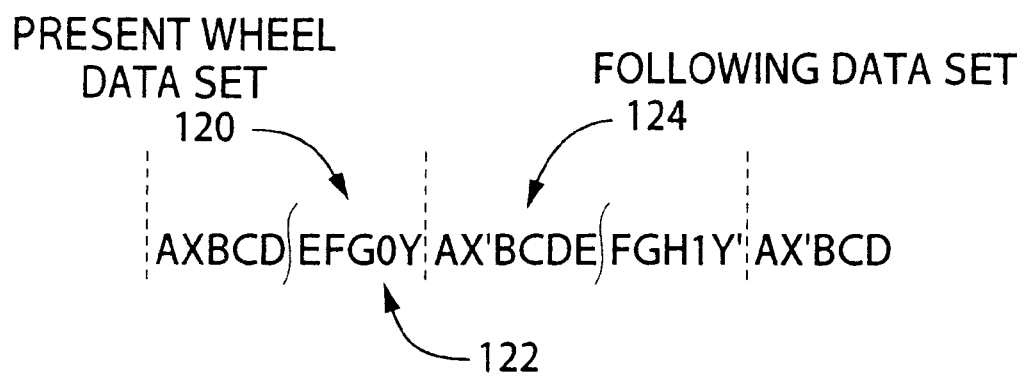

SYNCHRONIZATION DATA: A
DIVIDING POSITION DATA: $A_0, A_1$
TRAILER DATA: X
CHECK SUM DATA: Y
OTHER DATA: B, C, D, E, F, G, ···

VEHICLE WHEEL INFORMATION SUPPLY DEVICE WHICH SUPPLIES SMALLER DATA SET EARLIER THAN LARGER DATA SET

BACKGROUND OF THE INVENTION

1. Field of the Invention

The present invention relates to a vehicle wheel information supply device for supplying wheel information representative of a state of a wheel of a vehicle, to a receiver disposed on a body of the vehicle.

2. Discussion of the Related Art

JP-U-5-13802 discloses an example of such kind of vehicle wheel information supply device in the form of a tire air pressure information supply device adapted to supply tire air pressure information indicating whether an air pressure in a tire of a wheel of an automotive vehicle is normal or not. This tire air pressure information supply device includes an air pressure detector disposed on the vehicle wheel to detect the air pressure of the wheel tire, and an air pressure information transmitter also disposed on the vehicle wheel to transmit the tire air pressure information. Based on an output of the air pressure detector, the air pressure information transmitter intermittently transmits a pulse signal of a predetermined pattern when the output indicates that the tire air pressure is normal, and continuously transmits a pulse signal of another predetermined pattern when the output indicates that the tire air pressure is abnormal. The tire air pressure information transmitted by the tire air pressure information supply device is received by a receiver which is disposed on the vehicle body.

SUMMARY OF THE INVENTION

It is therefore an object of this invention to provide an improved vehicle wheel information supply device. This object may be achieved according to any one of the following modes of the invention, each of which is numbered like the appended claims and depends from the other mode or modes, where appropriate, to indicate possible combinations of elements or technical features. However, it is to be understood that the invention is not limited to the modes described below and that any one of technical features recited in any one of the modes may be a subject matter of this invention.

(1) A vehicle wheel information supply device disposed on a wheel of a vehicle and supplying wheel information representative of a state of the wheel, to a receiver disposed on a body of the vehicle.

The wheel information is supplied from the vehicle wheel information supply device disposed on the vehicle wheel, to the receiver disposed on the vehicle body. The wheel information received by the receiver is available to a driver of the vehicle. The wheel information relating to the air pressure of the wheel tire may include: air pressure information indicative of the tire air pressure; air pressure reduction rate information indicative of a rate of reduction of the tire air pressure; air pressure assessment information indicative of whether the tire air pressure is normal; and abrupt air pressure reduction information indicating that the tire air pressure is lowered at a rate higher than a predetermined threshold. The wheel information relating to the temperature of the wheel tire may include: tire temperature information indicative of the temperature of the tire; tire temperature rise rate information indicative of a rate of rise of the tire temperature; excessive tire temperature rise information indicating that the tire temperature is higher than a predetermined upper limit; and an abrupt tire temperature rise information indicating that the tire temperature is rising at a rate higher than a predetermined threshold. The wheel information relating to the shape or deformation of the tire may include: tire deformation information indicative of a deformation of the tire; excessive tire deformation information indicative of an excessive amount of deformation of the tire; and other sorts of information as described above with respect to the tire air pressure and temperature.

(2) A vehicle wheel information supply device disposed on a wheel of a vehicle and comprising; a wheel state detector which detects a state of the wheel; a wheel information generator which generates wheel information on the basis of an output of the wheel state detector; and a transmitter which transmits the wheel information to a receiver disposed on a body of the vehicle.

The wheel information generated by the information generator may be information indicative of the state of the wheel detected by the wheel state detector, information indicative of a state relating to the state of the wheel, or assessment information indicative of whether the state of the wheel is normal.

(3) A vehicle wheel information supply device according to mode (2), further comprising an information supply controller which controls at least one of the wheel information generator and the transmitter, for thereby controlling a condition in which the wheel information is supplied.

(4) A vehicle wheel information supply device according to any one of modes (1)–(3), wherein the vehicle wheel information supply device is capable of successively supplying a plurality of wheel data sets, as the wheel information, which represent the state of the wheel at the same point of time and which have respective data volumes different from each other, and wherein the vehicle wheel information supply device supplies the plurality of wheel data sets to the receiver in a predetermined order such that a smallest one of the wheel data sets whose data volume is the smallest among the wheel data sets is supplied earlier than the other of the wheel data sets.

The vehicle wheel information supply device according to this mode (4) of the invention is designed with an object of increasing a probability that at least one of the supplied wheel data sets is completely received by the receiver, thereby making the complete wheel data set available on the side of the vehicle body as early as possible even within a short time of data reception, after each update of the wheel information in which the wheel information is updated to represent the wheel state at the latest point of time.

In the vehicle wheel information supply device defined in this mode (4), a smallest one of the wheel data sets whose data volume is the smallest among the wheel data sets is supplied earlier than the other of the wheel data sets. Since the time period required to supply the smallest wheel data set to the receiver is shorter than the time required to supply the other wheel information set or sets, the above-described probability is made larger than where a largest one of the wheel data sets whose data volume is the largest among the wheel data sets is supplied earlier than the other of the wheel data set. Thus, the present vehicle wheel information supply device is effective to provide a high probability that at least one of the supplied wheel data sets is completely received by the receiver even where the time period in which the wheel information can be received by the receiver is short. In other words, the present vehicle wheel information supply device permits a complete wheel data set to be available on the vehicle body as early as possible, after each update of the wheel information, even where the receivable time period is short.

It is noted that, where three or more wheel data sets having the respective data volumes different from each other are supplied by the present vehicle wheel information supply device, the smallest wheel data set may be followed by the second smallest wheel data set, as described below in mode (5), or alternatively may be followed by other wheel data set. That is, after the smallest wheel data set has been supplied, the remaining wheel data sets may be supplied in any order irrespective of the respective data volumes. If the largest wheel data set is supplied following the smallest wheel data set, for example, it is possible to make the detailed wheel data set available on the vehicle body earlier than where the largest wheel data set is supplied later than the other wheel data set or sets.

It is also noted that each of the wheel data sets may be supplied once or a plurality of times. Further, the numbers of the supply of the respective wheel data sets do not have to be equal to each other, but may be different from each other. The numbers of times of the supply of the respective wheel data sets per unit time also do not have to be equal to each other, but may be different from each other.

(5) A vehicle wheel information supply device according to mode (4), wherein the vehicle wheel information supply device supplies the plurality of wheel data sets to the receiver such that a smaller one of the wheel data set whose data volume is smaller than that of a larger one of the wheel data sets is supplied earlier than the larger one of the wheel data sets.

(6) A vehicle wheel information supply device according to any one of modes (1)–(5), wherein the wheel information includes at least one wheel data set which includes primary data indicative of the state of the wheel, and ancillary data.

The wheel data set includes the primary data and the ancillary data, and constitutes a unit of information which is supplied to the receiver. The data volume of the wheel data set can be changed by changing at least one of the data volumes of the primary data and the ancillary data.

Where the volume of the primary data of the wheel data set is reduced, the number of items represented by the primary data is reduced, but the total data volume of the wheel data set is reduced. For instance, the total data volume of the wheel data set can be smaller where the wheel data set does not include one or both of air pressure data and tire temperature data, than where the wheel data set includes both of the air pressure data and the tire temperature data.

The ancillary data may include header/trailer data, identification data and transmission state data. The beader/trailer data indicative of the opposite ends of the unit of information, i.e., the opposite ends of the wheel data set. The header/trailer data may include at least one of header data indicative of the front end of the wheel data set, and trailer data indicative of the rear and of the wheel data set. The trailer data indicative of the rear end of the wheel data set represent the data volume or length of the wheel data set supplied by the vehicle wheel information supply device. In this sense, the trailer data can be referred to as volume-indication data or length-indication data.

The identification data identify the transmitter from which the wheel data set including the identification data is transmitted to the receiver. The data volume of the identification data generally increases with an increase in the accuracy with which the transmitter can be identified by the identification data.

The transmission state data indicate a state of transmission of the wheel data set from the transmitter disposed on the vehicle wheel. For example, the transmission state information may include data indicating whether the transmitter is normal or abnormal, data indicative of a battery provided in the transmitter or in the vehicle wheel information supply device, and data indicative of an actual voltage of the battery. The transmission state data, which are not essential, may not be included in the wheel data set, or the data volumes of the transmission state data may be reduced, so that the volume of the ancillary data is reduced. Similarly, the header data and the trailer data way not be included in the wheel information, or the volumes of the header and trailer data may be reduced.

(7) A vehicle wheel information supply device according to any one of modes (1)–(6), capable of successively supplying a plurality of wheel data sets as the wheel information, and wherein the vehicle wheel information supply device supplies the plurality of wheel data sets to the receiver in a manner making it possible to determine whether two successively supplied sets of the wheel data sets have a mutually complementary relation for cooperating with each other to form, as a substitute for the two successively supplied sets, a complete wheel data set constituted by parts of the respective two successively supplied sets.

The vehicle wheel information supply device defined in this mode (7) is designed with an object of making the wheel information available on the vehicle body as early as possible. Described more specifically, the present vehicle wheel information supply device is designed for making it possible to obtain at least one complete wheel data set, even where any one of the wheel data sets cannot be completely received by the receiver. Each of the above-indicated at least one complete wheel data set can be obtained by connecting the parts of the two successively supplied wheel data sets, which parts are received by the receiver. In this mode (7) of the invention, therefore, it is possible to obtain a complete wheel data set earlier or in a shorter time, than where a complete reception of the entirety of a wheel data set is awaited without connecting the received parts of the two wheel data sets.

In the vehicle wheel information supply device defined in this mode (7), the wheel data sets are supplied in a manner making it possible to determine whether the two successively supplied wheel data sets have the mutually complementary relation for cooperating with each other to form the complete wheel data set constituted by their respective parts which are connected, combined or bonded to each other. The mutually complementary relation can be also referred to a mutually connectable relation, a mutually combinable relation or a mutually bondable relation. The determination of whether the two wheel data sets have the mutually complementary relation may be made by the receiver. If an affirmative decision is obtained in this determination, the parts of the respective two wheel data sets are combined into the complete wheel data set.

(8) A vehicle wheel information supply device according to mode (7), wherein each of the wheel data sets includes complementary-relation-indication data indicative of whether the two successively supplied sets of the wheel data sets have the mutually complementary relation.

(9) A vehicle wheel information supply device according to any one of modes (2)–(8), wherein the wheel information generator is capable of generating a plurality of wheel data sets, as the wheel information, each of which include as complementary-relation-indication data indicative of whether two of the successively supplied wheel data sets have a mutually complementary relation for cooperating with each other to form, as a substitute for the two successively supplied sets, a complete wheel data set constituted by parts of the respective two successively supplied sets.

In the vehicle wheel information supply device of mode (9), the wheel data sets each including the complementary-relation-indication data can be generated by the wheel information generator. The above-described determination of whether the two successively supplied wheel data sets have the mutually complementary relation or not can be made on the basis of the complementary-relation-indication data included in each wheel data set. The determination may be made by the receiver which receives the wheel data sets from the transmitter.

(10) A vehicle wheel information supply device according to any one of modes (2)–(9), wherein the transmitter is capable of transmitting a plurality of wheel data sets, as the wheel information, which are generated by the wheel information generator, to the receiver in a manner making it possible to determining whether two successively supplied sets of the wheel data sets have a mutually complementary relation for cooperating with each other to form, as a substitute for the two successively supplied sets, a complete wheel data set constituted by parts of the respective two successively supplied sets.

For facilitating the above-described determination which is made for example, by the receiver disposed on the vehicle body, the time interval between the transmissions of the respective two successively supplied wheel data sets by the transmitter where the two successively supplied wheel data sets have the mutually complementary relation, may be different from that where the two successively supplied wheel data sets do not have the mutually complementary relation, so that the determination can be made on the basis of the time interval between the transmissions. Where the two successively supplied wheel data sets are determined to have the mutually complementary relation provided that the two wheel data sets are the same in kind, the determination can be facilitated, for example, by changing the frequency of the transmission of each wheel data set by the transmitter depending upon the kind of the wheel data sets. Further, the transmitter may add a flag or other data indicative of whether the two successively supplied two wheel data sets, to each wheel data set, prior to the transmission of each wheel data set, as described below in mode (11). It is noted that the same kind of wheel data sets may be interpreted to mean, for example, wheel data sets representing the state of the wheel at the same point of time and/or having the same data volume.

(11) A vehicle wheel information supply device according to mode (10), wherein the transmitter adds complementary-relation-indication data to each of the wheel data sets generated by the wheel information generator before transmitting the wheel data sets to the receiver, the data added by the transmitter being indicative of whether the two successively supplied sets of the wheel data sets have the mutually complementary relation.

(12) A vehicle wheel information supply device according to any one of modes (1)–(11), capable of successively supplying a plurality of wheel data sets as the wheel information, and wherein the vehicle wheel information supply device supplies the plurality of wheel data sets to the receiver in a manner making it possible to determine whether two successively supplied sets of the wheel data sets represent the state of the wheel at the same point of time.

Where the two successively supplied wheel data sets are determined to have the mutually complementary relation provided that the two wheel data sets represent the state of the wheel at the same point of time, the above-described determination of whether the two wheel data sets have the mutually complementary relation or not can be made by determining whether the two wheel data sets represent the state of the wheel at the same point of time or not. It is noted that the two wheel data sets may be determined to have the mutually complementary relation provided that the two wheel data sets represent the wheel state at the same point of time and have the same data volume.

(13) A vehicle wheel information supply device according to any one of modes (1)–(12), capable of successively supplying a plurality of wheel data sets as the wheel information, and wherein the vehicle wheel information supply device supplies the plurality of wheel data sets to the receiver in a manner making it possible to determine whether two successively supplied sets of the wheel data sets have the same data volume.

Where the two successively supplied wheel data sets are determined to have the mutually complementary relation provided that the two wheel data sets have the same volume, the above-described determination of whether the two wheel data sets have the mutually complementary relation or not can be made by determining whether the two wheel data sets have the same data volume or not. It is noted that the two wheel data sets may be determined to have the mutually complementary relation provided that the two wheel data sets have the same data volume and the represent the wheel state at the same point of time.

(14) A vehicle wheel information supply device according to any one of modes (1)–(13), capable of successively supplying a plurality of wheel data sets as the wheel information, and comprising at least one of a first information supplier and a second information supplier, the first information supplier supplying the plurality of wheel data sets to the receiver in a manner making it possible to determine whether each of the wheel data sets and a preceding one of the wheel data sets which is supplied immediately before the each wheel data set have a mutually complementary relation for cooperating with each other to form a complete wheel data set constituted by a part of the each wheel data set and a part of the preceding wheel data set, the second information supplier supplying the plurality of wheel data sets to the receiver in a manner making it possible to determine whether each of the wheel data sets and a following one of the wheel data sets which is supplied immediately after the each wheel data set have a mutually complementary relation for cooperating with each other to form a complete wheel data set constituted by a part of the each wheel data set and a part of the following wheel data set.

When each wheel data set is supplied from the vehicle wheel information supply device of this mode (14) to the receiver, the determination of whether the two successively supplied wheel data sets have the mutually complementary relation or not can be made, for example, by the receiver. If a positive decision is obtained in the determination, the parts of the respective two wheel data sets are connected to each other so that the complete wheel data set constituted by the parts of the two wheel data sets is obtained.

There will be explained a case where the present vehicle wheel information supply device supplies the wheel data sets which represent the wheel state at the same time and have the respective data volumes different from each other, wherein at least one of the wheel data sets is repeatedly supplied a plurality of times. In this case, the two successively supplied wheel data sets are determined to have the mutually complementary relation, provided that the two successively supplied wheel data sets correspond to the same wheel data set repeatedly supplied by the wheel information supply device. To this end, the wheel data sets are supplied by the vehicle wheel information supply device to the receiver in a manner which makes it possible to determine the two successively supplied wheel data sets have the same data volume or not.

Where wheel data sets A, B, C having the respective data volumes different from each other are successively supplied in this order by the first information supplier such that each of the wheel data sets A, B, C is repeatedly supplied a plurality of times (N times), for example, the wheel data set B is supplied with an indication of "$B_1(0)$" in the first supply thereof which follows the N-th supply of the wheel data set A. The indication of "$B_1(0)$" indicates that the wheel data set $B_1$ does not have the mutually complementary relation with the preceding wheel data set $A_N$. (The "0" indicates that the wheel data set in question does not have the mutually complementary relation with the preceding wheel data set.) Then, when the wheel data set B is supplied for the second time, the wheel data set B is accompanied by an indication of "$B_2(1)$", which indicates that the wheel data set $B_2$ has the mutually complementary relation with the preceding wheel data set $B_1$. (The "1" indicates the wheel data set in question has the mutually complementary relation with the preceding wheel data set.) Thereafter, the wheel data set B is supplied in the following times with the indications of "$B_3(1)$", "$B_4(1)$", . . . , "$B_{N-}(1)$", "$B_N(1)$". When the wheel data set C is supplied for the first time, the wheel data set C is accompanied by the indication with an indication of "$C_1(0)$", which indicates that the wheel data set $C_1$ does not have the mutually complementary relation with the preceding wheel data set $B_N$.

Where the wheel data sets A, B, C are successively supplied by the second information supplier, the wheel data set B is supplied with an indication of "$B_1(1)$" in the first supply thereof which follows the N-th supply of the wheel data set A. The indication of "$B_1(1)$" indicates that the wheel data set $B_1$ has the mutually complementary relation with the following wheel data set $B_2$, which is the wheel data set B supplied for the second time. Thereafter, the wheel data set B is supplied in the following times with indications of "$B_2(1)$", "$B_4(1)$", "$B_3(1)$", "$B_4(1)$", . . . , "$B_{N-1}(1)$", "$B_N(0)$". The indication of "$B_N(0)$" indicates that the wheel data set $B_N$, which is the wheel data Set B supplied for the N-th time, does not have the mutually complementary relation with the following wheel data set C1, which is the wheel data set C supplied for the first time.

As is clear from the above description, the wheel data sets are supplied in a manner making it possible to determine whether the supply of each wheel data set corresponds to the fist supply of the wheel data Set or not, where the wheel data sets are supplied by the first information supplier. The wheel data sets are supplied in a manner making it possible to determine whether the supply of each wheel data set corresponds to the N-th supply, i.e., the last supply of the wheel data set or not, where the -wheel data sets are supplied by the second information supplier. In other words, the first information supplier supplies the wheel data sets in a manner which makes it possible to determine whether the data volume or length of the wheel data set in question is different from that of the preceding wheel data set or not, while the second supplier supplies the wheel data sets in a manner which makes it possible to determine whether the data volume or length of the wheel data set in question is different from that of the following wheel data set or not.

The vehicle wheel information supply device of this mode (14) will be described more specifically in the DETAILED DESCRIPTION OF THE PREFERRED EMBODIMENT given below.

(15) A vehicle wheel information supply device according to mode (14), wherein each of the wheel data sets includes first complementary-relation-indication data indicative of whether the each of the wheel data sets and the preceding one of the wheel data sets have the mutually complementary relation, where the wheel data sets are supplied from the first information supplier, and wherein each of the wheel data sets includes second complementary-relation-indication data indicative of whether the each of the wheel data sets and the following one of the wheel data sets have the mutually complementary relation, where the wheel data sets are supplied from the second information supplier.

(16) A vehicle wheel information supply device according to any one of modes (2)–(15), wherein the wheel information generator is capable of generating a plurality of wheel data sets as the wheel information, and includes at least one of a first generating portion and a second generating portion, the first information generating portion generating the wheel data sets such that each of the wheel data sets includes first complementary-relation-indication data indicative of whether the each of the wheel data sets and a preceding one of the wheel data sets which is supplied immediately before the each wheel data set have a mutually complementary relation for cooperating with each other to form a complete wheel data set constituted by a part of the each wheel data set and a part of the preceding wheel data set, the second information generating portion generating the wheel data sets such that each of the wheel data sets includes second complementary-relation-indication data indicative of whether the each of the wheel data sets and a following one of the wheel data sets which is supplied immediately after the each wheel data set have a mutually complementary relation for cooperating with each other to form a complete wheel data set constituted by a part of the each wheel data set and a part of the following wheel data set.

(17) A vehicle wheel information supply device according to mode (16), wherein the first complementary-relation-indication data are located in a front part of the each wheel data set, and wherein the second complementary-relation-indication data are located in a rear part of the each wheel data set which is received, later than the front part, by the receiver.

In the vehicle wheel information supply device of this mode (17), the determination of whether each wheel data set and the preceding wheel data set have the mutually complementary relation or not can be made even if the rear part of the wheel data set in question can not be received by the receiver, since the first complementary-relation-indication data are located in the front part of each wheel data set. Where a positive decision is obtained in this determination based on the first complementary-relation-indication data, the rear part of the preceding wheel data set and the front part of the wheel data set in question, which have been received by the receiver, are combined into the complete wheel data set. Similarly, the determination of whether each wheel data set and the following wheel data set have the mutually complementary relation or not can be made even if the front part of the wheel data set in question can not be received by the receiver, since the second complementary-relation-indication data are located in the rear part of each wheel data set. Where a positive decision is obtained in this determination based on the second complementary-relation-indication data, the rear part of the wheel data set in question and the front part of the following wheel data set, which have been received by the receiver, are combined into the complete wheel data set.

The locations of the first and second complementary-relation-indication data in each wheel data set may be determined, for example, depending upon the data volume or length of the wheel data set. The first complementary-relation-indication data may be located in the first one-third part, the first one-fourth part, or the first one-fifth part of each wheel data set, or may be located even in the front end of each wheel data set. The second complementary-relation-indication data may be located in the last one-third part, the last one-fourth part, the last one-fifth part of each wheel data set, or may be located even in the rear end of each wheel data set. Further, at least one of the first and second complementary-relation-indication data may be located in the intermediate part of each wheel data set.

It is also possible to replace the first and second complementary-relation-indication data with third complementary-relation-indication data which are indicative of whether each wheel data set has the mutually complementary relation with at least one of the preceding wheel data set and the following wheel data set. It is noted that these first, second and third complementary-relation-indication data belong to the above-described ancillary data.

(18) A vehicle wheel information supply device according to any one of modes (2)–(17), wherein the transmitter is capable of successively transmitting a plurality of wheel data sets, as the wheel information, which are generated by the wheel information generator, and wherein the transmitter includes at least one of a first transmitting portion and a second transmitting portion, the first transmitting portion transmitting the plurality of wheel data sets to the receiver in a manner making it possible to determine whether each of the wheel data sets and a preceding one of the wheel data sets which is supplied immediately before the each wheel data set have a mutually complementary relation for cooperating with each other to form a complete wheel data set constituted by a part of the each wheel data set and a part of the preceding wheel data set, the second transmitting portion transmitting the plurality of wheel data sets to the receiver in a manner making it possible to determine whether each of the wheel data sets and a following one of the wheel data sets which is supplied immediately after the each wheel data set have a mutually complementary relation for cooperating with each other to form a complete wheel data set constituted by a part of the each wheel data set and a part of the following wheel data set.

(19) A vehicle wheel information supply device according to any one of modes (1)–(18), capable of successively supplying a plurality of wheel data sets, as the wheel information, each of which includes volume-indication data indicative of a predetermined total data volume of the each of the wheel data sets.

With the supply of the wheel data sets each including the volume-indication data by the present vehicle wheel information supply device, the parts of respective two successively supplied sets of the wheel data sets are connected with each other in, for example, the receiver, on the basis of the complementary-relation-indication data and the total data volume of the wheel data set indicated by the volume-indication data.

For connecting the parts of the two wheel data sets with each other, a deficient data volume of the wheel data set in question is first calculated by subtracting an actually received data volume of the wheel data set in question from the predetermined total data volume of the wheel data set in question, which volume is indicated by the volume-indication data. Then, a part of the preceding or following wheel data set, which part has a data volume corresponding to the calculated deficient data volume is transferred to the wheel data set in question, so that the wheel data set in question and the preceding or following wheel data set cooperate with each other to form a complete wheel data set constituted by the parts of the respective two wheel data sets.

It is noted that the volume-indication data correspond to the above-described trailer data which belong to the ancillary data, and the volume-indication data may be referred to as length-indication data since the volume-indication data represent data length of each wheel data set.

(20) A vehicle wheel information supply device according to any one of modes (1)–(19), capable of successively supplying a plurality of wheel data sets, as the wheel information, each of which includes dividing-position-indication data indicating division between a front part and a rear part of each of the wheel data sets, so that a complete wheel data set is constituted by the rear part of one of two successively supplied sets of the wheel data sets and the front part of the other of the two successively supplied sets of the wheel data sets, where the two successively supplied sets of the wheel data sets have a mutually complementary relation for cooperating with each other to form the complete wheel data set.

With the supply of the wheel data sets each including the dividing-position-indication data by the present vehicle wheel information supply device, the parts of respective two successively supplied sets of the wheel data sets are connected with each other in, for example, the receiver, on the basis of the dividing-position-indication data as well as the above-described complementary-relation-indication data.

The dividing-position-indication data indicate that each wheel data set is divisible into the front and rear parts, and that one of the front and rear parts of the wheel data set in question is combinable to the rear part of the preceding as wheel data set or the front part of the following wheel data set. Thus, where the two successively supplied wheel data sets are determined to have the mutually complementary relation, the rear part of the preceding one of the two wheel data sets and the front part of the following one of the two wheel data sets are combined into a complete wheel data set. It is noted that the dividing-position-indication data may be referred to as connecting-position-indication data. It is also noted that the dividing-position-indication data can be adapted to serve also as the complementary-relation-indication data, as described below in mode (21).

(21) A vehicle wheel information supply device according to mode (20), wherein the dividing-position-indication data further indicate whether the two successively supplied sets of the wheel data sets have the mutually complementary relation.

(22) A vehicle wheel information supply device according to any one of modes (2)–(21), wherein the wheel state detector includes at least one of an air pressure detecting portion which detects an air pressure in a tire of the wheel and a tire temperature detecting portion which detects a temperature of the tire.

(23) A vehicle wheel information supply device according to any one of modes (3)–(22), wherein the information supply controller controls at least one of the wheel information generator and the transmitter on the basis of the state of the wheel detected by the wheel state detector.

In the vehicle wheel information supply device of this mode (23), the information supply controller controls at least one of the condition of generation of the wheel information and the condition of transmission of the wheel information, on the basis of the wheel state such as the tire air pressure or the rotating speed of the wheel. A wheel speed detector for detecting the rotating speed of the wheel may be disposed on either the vehicle body or the wheel itself

(24) A vehicle wheel information supply and receive apparatus comprising:

the vehicle wheel information supply device defined in any one of modes (1)–(23); and the receiver which is disposed on the body of the vehicle and which receives the wheel information supplied from the vehicle wheel information supply device.

(25) A vehicle wheel information supply and receive apparatus according to mode (24), wherein the receiver is held in an intermittent receiving mode in which a receivable state and an unreceivable state are alternately established so that the wheel information can be received by the receiver at a predetermined time interval, when the vehicle is not allowed to run.

When the vehicle is not allowed to run (for example, when the driving device of the vehicle is not activated with the ignition switch held OFF), the receiver is held in the intermittent receiving mode. This intermittent receiving mode is changed to a receiving mode, when the receiver receives the wheel information. This receiving mode is changed back to the intermittent receiving mode once the receiver begins to receive a noise or other signal which is obviously different from a signal of the wheel information and which is unnecessary to be received by the receiver.

Thus, the intermittent receiving mode is not necessarily changed to the receiving mode even if the wheel information is supplied from the vehicle wheel information supply device. The receiving mode is changed back to the intermittent receiving mode once the receiver begins to receive a noise or other unnecessary signal, even if the wheel information keeps to be supplied from the vehicle wheel information supply device. That is, when the driving device of the vehicle is not activated, the time period in which the information can be received by the receiver is short. In even such a situation, it is possible to maintain a high probability that at least one of the supplied wheel data sets is completely received by the receiver, by supplying the smaller one of the wheel data sets earlier than the larger one of the wheel data sets.

The vehicle wheel information supply and receive apparatus of this mode (25) will be described more specifically in the DETAILED DESCRIPTION OF THE PREFERRED EMBODIMENT given below.

(26) A vehicle wheel information supply and receive apparatus according to mode (24) or (25), wherein the vehicle wheel information supply device capable of successively supplying a plurality of wheel data sets as the wheel information, and wherein the receiver includes a data connecting portion which connects parts of respective two of the wheel data sets that are successively received by the receiver.

In the vehicle wheel information supply and receive apparatus of this mode (26), the parts of the respective two successively supplied wheel data sets are connected by the data connecting portion of the receiver. This connection may be made on the basis of the volume-indication data and/or the dividing-position-indication data and/or the complementary-relation-indication data. Operation modes of the data connecting portion will be described in the DETAILED DESCRIPTION OF THE PREFERRED EMBODIMENT given below.

(27) A vehicle wheel information indicating system comprising:

the vehicle wheel information supply and receive apparatus defined in any one of modes (24)–(26); and an indicator which provides a driver of the vehicle with an indication of the state of the wheel based on the wheel information received by the receiver.

BRIEF DESCRIPTION OF THE DRAWINGS

The above and optional objects, features, advantages and technical and industrial significance of this invention will be better understood by reading the following detailed description of presently preferred embodiment of the invention, when considered in connection with the accompanying drawings, in which:

FIGS. 4($a$), ($b$), ($c$) and ($d$) are views illustrating operations of a transmitter of the vehicle wheel information supply device and the receiver of FIG. 1;

FIG. 7 is a view illustrating an operation of the receiver of FIG. 1, in which a part of a wheel data set and a part of the preceding wheel data set are combined into a complete wheel data set;

FIG. 10 is a view illustrating an operation of the receiver of FIG. 1, in which a part of a wheel data set and a part of the following wheel data set are combined into a complete wheel data set;

DETAILED DESCRIPTION OF THE PREFERRED EMBODIMENT

There will be described a vehicle wheel information supply device constructed according to an embodiment of this invention.

Figure 1:
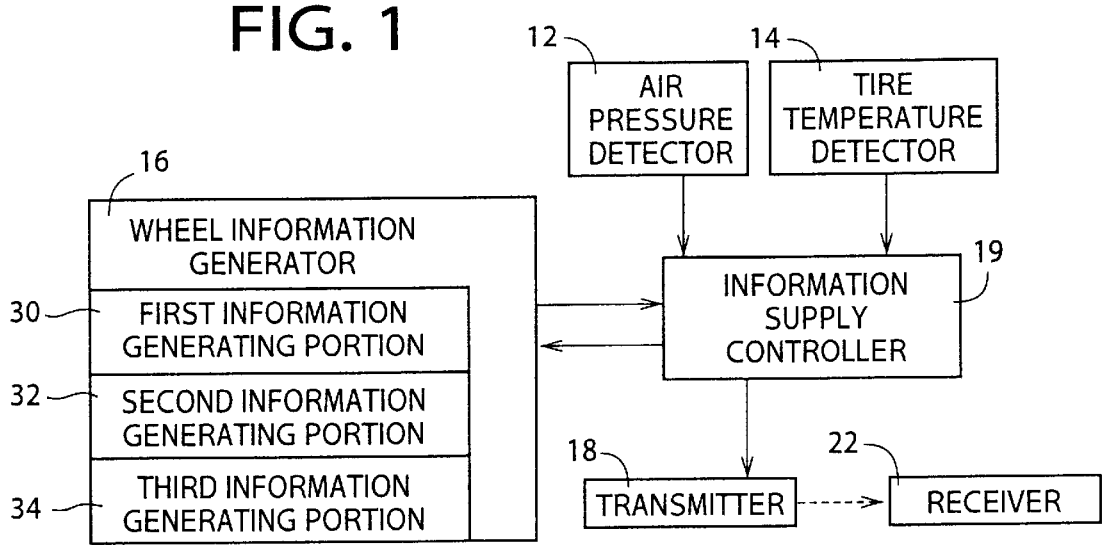
FIG. 1 is a block diagram showing a vehicle wheel information supply device which is constructed according to an embodiment of this invention and which is connected to a receiver disposed on a vehicle body.
Figure 2:
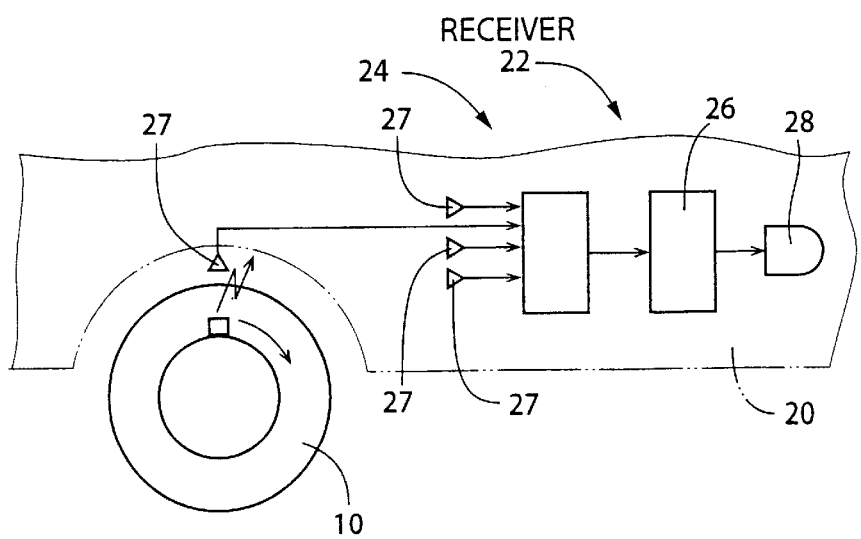
FIG. 2 is a schematic view showing the vehicle wheel information supply device and the receiver of FIG. 1.

FIGS. 1 and 2 show the vehicle wheel information supply device, which is disposed on each of front right and left and rear right and left wheels 10 of an automotive vehicle. The vehicle wheel information supply device includes an air pressure detector 12 for detecting an air pressure in a tire of the corresponding wheel 10, a tire temperature detector 14 for detecting a temperature of the tire, a wheel information generator 16 for generating wheel information representative of a state of the wheel 10, a transmitter 18 for transmitting the wheel information generated by the wheel information generator 16, and an information supply controller 19 which controls the wheel information generator 16 and the transmitter 18.

On a body 20 of the vehicle to which the wheels 10 are connected, there is disposed a receiver 22 which includes a receiving portion 24 and a controlling portion 26. The receiving portion 24 includes four antennas 27 so as to receive, through the antennas 27, the wheel information transmitted by the transmitter 18. The four antennas 27 are located at respective positions at which the wheel information can be received from the respective transmitters 18 disposed on the respective four wheels 10. The receiving portion 24 is adapted to amplify and demodulate the wheel information, and then supply the wheel information to the controlling portion 26. The supplied wheel information is read out in the controlling portion 26.

The controlling portion 26 is connected to an indicator 28 which is provided in a driver's compartment of the vehicle, and controls the indicator 28 to provide an indication of the state of each wheel 10 based on the received wheel information so that the vehicle driver is informed of the state of each wheel 10. The indicator 28 includes an alarm light which is adapted to blink, for example, when the tire air pressure is extremely low, in order to inform the vehicle driver of the emergency.

The information supply controller 19 is principally constituted by a computer incorporating a central processing unit (CPU), a random-access memory (RAM), a read-only memory (ROM), an input portion and an output portion. To the input portion of the information supply controller 19, there are connected the air pressure detector 12 and the tire temperature detector 14.

Figure 3:
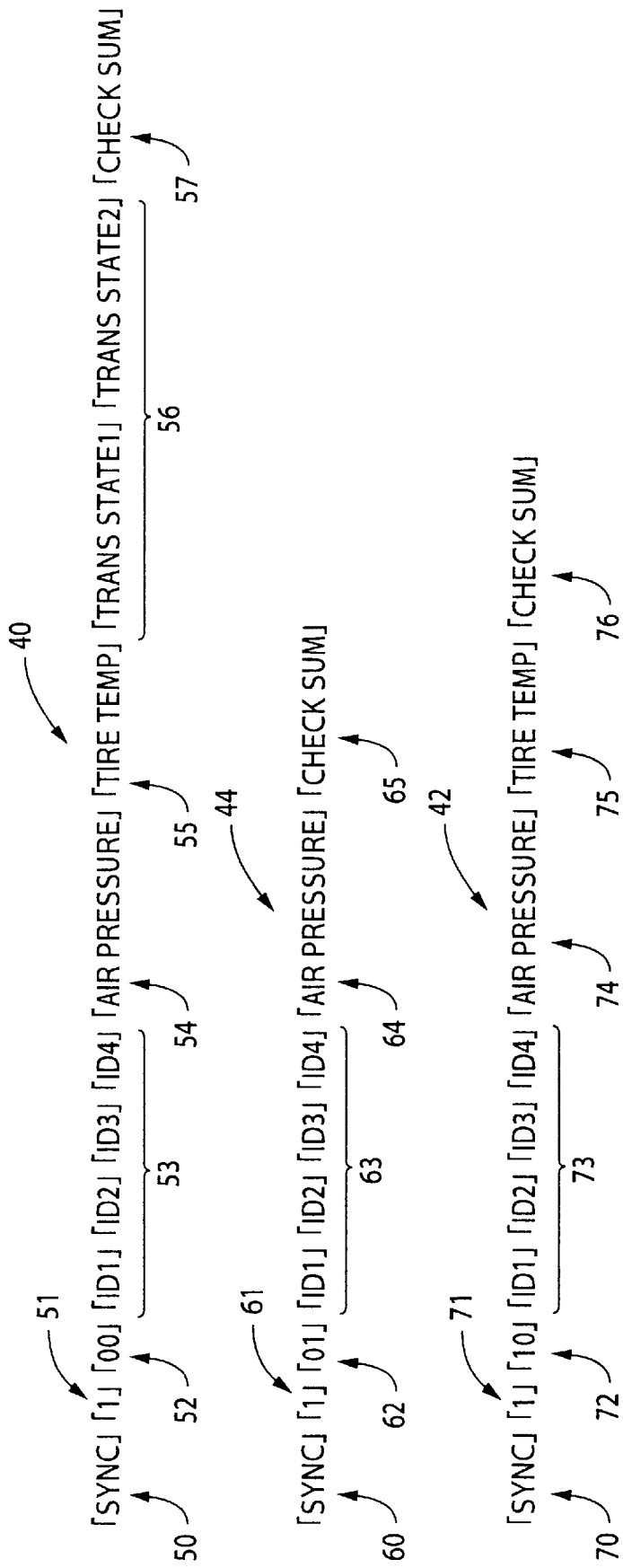
FIG. 3 is a view illustrating wheel information in the form of wheel data sets which are generated by a wheel information generator of the vehicle wheel information supply device of FIG. 1.

To the output portion of the information supply controller 19, there are connected the wheel information generator 16 and the transmitter 18. The wheel information generator 16 is adapted to generate the wheel information in a response to output of the information supply controller 19, and then supply the generated wheel information to the information supply controller 19. The wheel information generator 16 includes a first information generating portion 30, a second information generating portion 32 and a third information generating portion 34. These first, second and third information generating portions 30, 32, 34 are adapted to generate a detailed wheel data set 40, a standard wheel data set 42 and an abridged wheel data set 44 as the wheel information, respectively, which are illustrated in FIG. 3. The transmitter 18 is adapted to transmit the wheel information through the antenna 27 to the receiver 22 which is disposed on the vehicle body 20. It is noted that the wheel information generator 16 may be principally constituted by a hardware circuit or a computer.

The controlling portion 26 is principally constituted by a computer incorporating a CPU, a RAM, a ROM, an input portion and an output portion. The ROM stores programs such as a data connecting program illustrated in the flow chart of FIG. 5.

Figure 12:
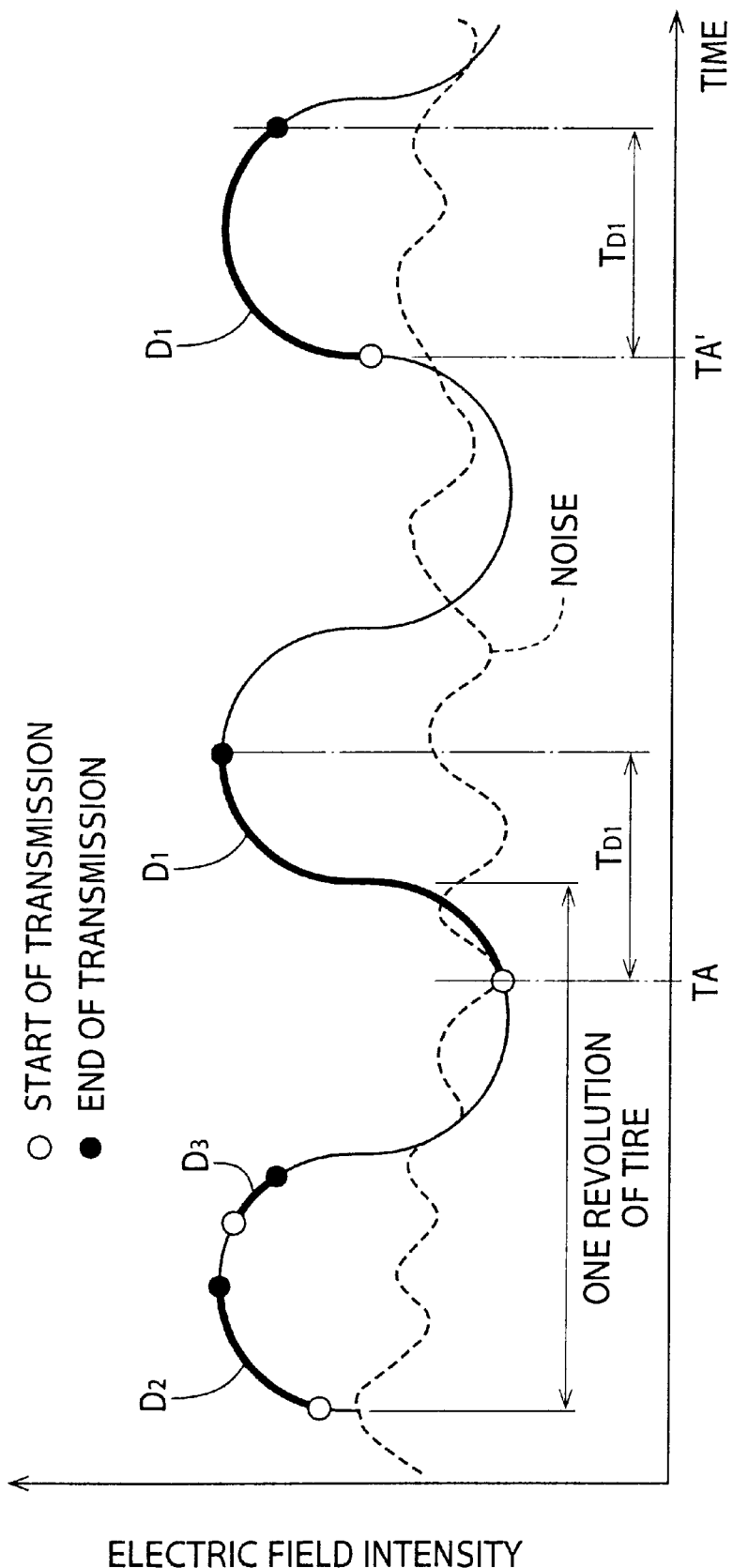
FIG. 12 is a view indicating a change in intensity of an electric field between the transmitter of the vehicle wheel information supply device and the receiver of FIG. 1.

When the wheel information is transmitted from the vehicle wheel information supply device disposed on a rotating vehicle wheel to the receiver disposed on a vehicle body, a distance between the vehicle wheel information supply device and the receiver changes with the rotation of the wheel. Accordingly, the intensity of an electric field between the information supply device and the receiver changes with a change in the above-described distance, as indicated in the graph of FIG. 12. That is, the intensity of the information signal received by the receiver changes as indicated in FIG. 12. The information transmitted from the information supply device can be received by the receiver when the intensity of the electric field is sufficiently high. When the intensity of the electric field is low, the transmitted information might be unreceivable by the receiver, due to an influence of a noise. While the intensity of the electric field is lower than that of the noise indicated by a broken line in FIG. 12, the transmitted wheel information cannot be received.

There are seen three kinds of wheel data sets $D_1$, $D_2$, $D_3$ as the wheel information in the graph of FIG. 12, which have respective data volumes different from each other. The wheel data set $D_1$ has a data volume larger than that of the wheel data set $D_2$ or $D_3$, and accordingly the time period required to transmit the wheel data set $D_1$ is longer than the time period required to transmit the wheel data set $D_2$ or $D_3$. Thus, the wheel data set $D_1$ has a relatively small reception ratio while each of the wheel data set $D_2$ or $D_3$ has a relatively large reception ratio. (The term "reception ratio" is defined as a probability of complete reception of the data set, and this ratio is generally increased with a reduction in the noise level and reduced with an increase in the noise level.) Where the wheel data set $D_1$ having the relatively small reception ratio is transmitted for a time period of $T_{D1}$, as indicated in FIG. 12, the wheel data set $D_1$ cannot be completely received if the transmission of the wheel data set $D_1$ starts at a point of time TA, but can be completely received if the transmission starts at a point of time TA'.

The intensity of the information signal received by the receiver is substantially constant while the vehicle is stopped, since the distance between the vehicle wheel information supply device and the receiver does not change while the vehicle wheel does not rotate. Also in this case, the transmitted wheel data set cannot be received when the noise level is increased to be higher than the intensity of the information signal. The reception ratio increases with a decrease in the volume of the data set and decreases with an increase in the volume of the data set, as in the above-described case where the intensity of the information signal received by the receiver changes.

The detailed wheel data set 40 is generated by the first information generating portion 30 of the wheel information generator 16, on the basis of the outputs of the air pressure detector 12 and the tire temperature detector 14 which outputs are read into the wheel information generator 16. The detailed wheel data set 40 constitutes a unit of information which consists of header data in the form of SYNCHRONIZATION data 50, COMPLEMENTARY-RELATION flag data 51, TRAILER data 52, IDENTIFICATION data 53, AIR PRESSURE data 54, TIRE TEMPERATURE data 55, TRANSMISSION STATE data 56 and CHECK SUM data 57. It will be understood that the AIR PRESSURE data 54 and the TIRE TEMPERATURE data 55 serve as primary data, while the SYNCHRONIZATION data 50, COMPLEMENTARY-RELATION flag data 51, TRAILER data 52, IDENTIFICATION data 53, TRANSMISSION STATE data 56 and CHECK SUM data 57 serve as ancillary data It will also be understood that the SYNCHRONIZATION data 50 and the TRAILER data 52 of the ancillary data serve as header/trailer data.

The abridged wheel data set 44 generated by the third information generating portion 34 of the wheel information generator 16 constitutes a unit of information which consists of SYNCHRONIZATION data 60, COMPLEMENTARY-RELATION flag data 61, TRAILER data 62, IDENTIFICATION data 63, AIR PRESSURE data 64 and CHECK SUM data 65. The abridged wheel data set 44 does not include TIRE TEMPERATURE data and TRANSMISSION STATE data, and the total volume of the abridged wheel data set 44 is smaller than that of the detailed wheel data set 40. It will be understood that the AIR PRESSURE data 64 and the TIRE TEMPERATURE data 55 serve as primary data, while the SYNCHRONIZATION data 60, COMPLEMENTARY-RELATION flag data 61, TRAILER data 62, IDENTIFICATION data 63 and CHECK SUM data 65 serve as ancillary data.

The standard wheel data set 42 generated by the second information generating portion 32 of the wheel information generator 16 constitutes a unit of information which consists of SYNCHRONIZATION data 70, COMPLEMENTARY-RELATION flag data 71, TRAILER data 72, IDENTIFICATION data 73, AIR PRESSURE data 74, TIRE TEMPERATURE data 75 and CHECK SUM data 76. The total volume of the standard wheel data set 42 is smaller than that of the detailed wheel data set 40 and is larger than that of the abridged wheel data set 44.

The SYNCHRONIZATION data 50, 60, 70 are provided for synchronization of the transmitter 18 with the receiver 22, and have a pattern different from that of the other data.

The COMPLEMENTARY-RELATION flag data 51, 61, 71 indicate whether two wheel data sets which are successively supplied are connectable with each other or not. In other words, the COMPLEMENTARY-RELATION flag data 51, 61, 71 indicate whether the two successively supplied wheel data sets have a mutually complementary relation for cooperating with each other to form, as a substitute for the two wheel data sets, a complete wheel data set constituted by parts of the respective two wheel data sets which parts are connected with each other. Where each of the detailed wheel data set 40, the standard wheel data set 42 and the abridged wheel data set 44 is successively transmitted a plurality of times, the COMPLEMENTARY-RELATION flag data are set at as each of theses wheel data sets 40, 42, 44 is transmitted for the first time, and is set at as each of these wheel data sets 40, 42, 44 is transmitted for the second and following time. Where the COMPLEMENTARY-RELATION flag data are set at, it indicates that the wheel data set in question is different in kind or data volume from the preceding wheel data set transmitted immediately before the wheel data set in question is not connectable with the preceding wheel data set. Where the COMPLEMENTARY-RELATION flag data are set at, it indicates that the wheel data set in question is the same in kind or data volume as the preceding wheel data set transmitted immediately before the wheel data set in question, and that the wheel data set in question is connectable with the preceding wheel data set.

The TRAILER data 52, 62, 72 indicate the rear end of he wheel data set, and represents a predetermined total volume of the wheel data set. In this sense, the TRAILER data 52, 62, 72 may be also referred to as volume-indication data. The predetermined total volume of the detailed wheel data set 40 is larger than those of the standard wheel data set 42 and the abridged wheel data set 44. The predetermined total volume of the abridged wheel data set 44 is smaller than those of the detailed wheel data set 40 and the standard wheel data set 42.

The CHECK SUM data 57, 65, 76 indicate an actual total volume of the wheel data set which has been transmitted from the transmitter 18. Thus, the actual total volume of the wheel data set indicated by the CHECK SUM data 57, 65 or 76 coincides with the predetermined total volume of the wheel data set indicated by the TRAILER data 52, 62 or 72 when the wheel data set has been completely received by the receiver 22.

The IDENTIFICATION data 53, 63, 73 are provided to check if each wheel data set transmitted from the transmitter 18 disposed on each of the four wheels 10 is received by the corresponding one of the four antennas 27 of the receiving portion 24 of the receiver 22 disposed at the respective positions on the vehicle body 20, which positions correspond to the respective four wheels 10. The data [ID1], [ID2], [ID3] and [ID4] of the IDENTIFICATION data correspond to the respective four antennas 27, i.e., the respective four wheels 10. Before the wheel data sets are transmitted from the transmitter 18, the data [ID1], [ID2], [ID3] and [ID4] are sent to the receiver 22, so as to be previously registered in the receiver 22, in relation to the respective antennas 27 or wheels 10. When each wheel data set is transmitted from the transmitter 18 for the particular wheel 10, the IDENTIFICATION data contained in the wheel data set are compared with the data previously registered in the receiver 22, to confirm that the transmitter 18 from which the wheel data set is transmitted corresponds to the appropriate antenna 27 or wheel 10.

The TRANSMISSION STATE data 56 indicate the state of transmission of each wheel data set, and include data indicating whether the vehicle wheel information supply device is normal, and data indicative of the residual amount of electric energy left (voltage) in a battery used in the transmitter 18.

The detailed wheel data set 40, the standard wheel data set 42 and the abridged wheel data set 44 are temporarily stored in RAM of the information supply controller 19, after these wheel data sets 40, 42, 44 have been generated by the wheel information generator 16. Each of these stored wheel data sets 40, 42, 44 is then transmitted a plurality of times by the transmitter 18, in a response to output of the information supply controller 19. In this instance, the abridged wheel data set 44, the standard wheel data set 42 and the detailed wheel data set 40 are transmitted in this order. Namely, the wheel data set having the smaller data volume is transmitted earlier than the wheel data set having the larger data volume. These wheel data set 40, 42, 44 are thus generated by the wheel information generator 16 and transmitted by the transmitter 18, not only when the vehicle is allowed to run (for example, when a driving device of the vehicle is activated with an ignition switch held ON) but also when the vehicle is not allowed to run (for example, when the driving device of the vehicle is not activated with the ignition switch held OFF).

When the driving device of the vehicle is not activated, the receiver 22 is held in INTERMITTENT RECEIVING mode in which a receivable state and an unreceivable state are alternated to each other so that the wheel information can be received by the receiver 22 at a predetermined time interval or with a predetermined cycle time, as shown in FIG. 4(a). This INTERMITTENT RECEIVING mode will be referred to as WAKING-UP mode in the following description.

The WAKING-UP mode is changed to RECEIVING mode, when the receiver 22 receives the wheel information from the transmitter 18 during the receivable state, as shown in FIG. 4(b). This RECEIVING mode is changed back to the WAKING-UP mode once the receiver 18 begins to receive a noise or other signal which is obviously different from a signal of the wheel information and which is not requested to be received by the receiver 18, as shown in FIG. 4(c).

Thus, the WAKING-UP mode is not necessarily changed to the RECEIVING mode even if the wheel information is transmitted by the transmitter 18. The RECEIVING mode is changed back to the WAKING-UP mode once the receiver 18 begins to receive a noise or other unnecessary signal, even if the wheel information keeps to be transmitted by the transmitter 18. That is, when the driving device of the vehicle is not activated, the time period in which the information can be received by the receiver 22 is short. FIG. 4(d) shows a case where a larger one of the wheel data sets whose data volume or length is comparatively large is supplied earlier than a smaller one of the wheel data sets whose data volume or length is comparatively small. On the other hand, FIG. 4(e) shows a case where the smaller one of the wheel data sets is supplied earlier than the larger one of the wheel data sets. As is apparent from FIGS. 4(d) and (e), it is possible to increase a probability that at least one of the supplied wheel data sets is completely received by the receiver, by supplying the smaller one of the wheel data sets earlier than the larger one of the wheel data sets.

As described above, the detailed wheel data set 40, the standard wheel data set 42 and the abridged wheel data set 44 are generated by the wheel information generator 16, and each of the wheel data sets 40, 42, 44 is then transmitted a plurality of times by the transmitter 18 such that the smallest wheel data set 44, the medium wheel data set 42 and the largest wheel data set 40 are transmitted in this order. In this instance, the wheel data sets 40, 42, 44 may be generated by the wheel information generator 16 in an order equal to this order of the transmission. Namely, the wheel information generator 16 may generate the smallest wheel data set 44, the medium wheel data set 42 and the largest wheel data set 40 in this order, so that each wheel data set can be transmitted by the transmitter 18 immediately after the generation by the wheel information generator 16.

While the abridged wheel data set 44, the standard wheel data set 42 and the detailed wheel data set 40 are transmitted in this order in the present embodiment, the abridged wheel data set 44 may be followed by the detailed wheel data set 44 in place of the standard wheel data set 42, for increasing a probability that the detailed wheel data set 44 is completely received by the receiver 22.

While each of the wheel data sets 40, 42, 44 is transmitted a plurality of times by the transmitter 18 in the present embodiment, each of these wheel data sets 40, 42, 44 may be transmitted only once. Further, the numbers of the transmission of the respective wheel data sets 40, 42, 44 do not have to be equal to each other, but may be different from each other.

While all the data of each of the wheel data sets 40, 42, 44 are generated by the wheel information generator 16 in the present embodiment, the COMPLEMENTARY-RELATION flag data 51, 61, 71 of the respective wheel data sets 40, 42, 44 may not be generated by the wheel information generator 16 so as to be added to the respective wheel data sets 40, 42, 44 in the transmitter 18.

There will be described an operation of the receiver 22 in which wheel data sets are connected to each other.

The controlling portion 26 of the receiver 22 first determines whether a value indicated by the CHECK SUM data of a wheel data set supplied from the receiving portion 24 of the receiver 22 coincides with a value indicated by the TRAILER data of the wheel data set. If the value of the CHECK SUM data coincides with the value of the TRAILER data, it is considered that the wheel data set has been completely received by the receiver 22, and the wheel data set is read into the controlling portion 26.

If the value of the CHECK SUM data is smaller than the value of the TRAILER data, it is considered that the wheel data set has not been completely received by the receiver 22. In this case, it is determined, on the basis of a value of the COMPLEMENTARY-RELATION flag data of the wheel data set, whether this wheel data set is connectable with the preceding wheel data set which has been supplied immediately before this wheel data set, namely, whether this wheel data set has the above-described mutually complementary relation with the preceding wheel data set. If a positive decision is obtained in this determination, parts of the respective two wheel data sets are connected to each other to form a single complete wheel data set, which is then read into the controlling portion 26 of the receiver 22.

Figure 6:
FIG. 6 is a view illustrating the wheel data sets which are successively supplied by the vehicle wheel information supply device of FIG. 1.

As described above, where each of the wheel data sets, which represent the state of the vehicle wheel in the same point of time and have the respective data volumes different from each other, is successively transmitted a plurality of times, the COMPLEMENTARY-RELATION flag data are set at [0] in the first transmission of each of the wheel data sets and are set at [1] in the second and following transmissions of each of the wheel data sets. FIG. 6 is a view illustrating a case where the abridged wheel data set 44, the standard wheel data set 42 and the detailed wheel data set 40 are transmitted in this order, with N times of the transmissions of each of these wheel data sets 44, 42, 40.

Figure 5:
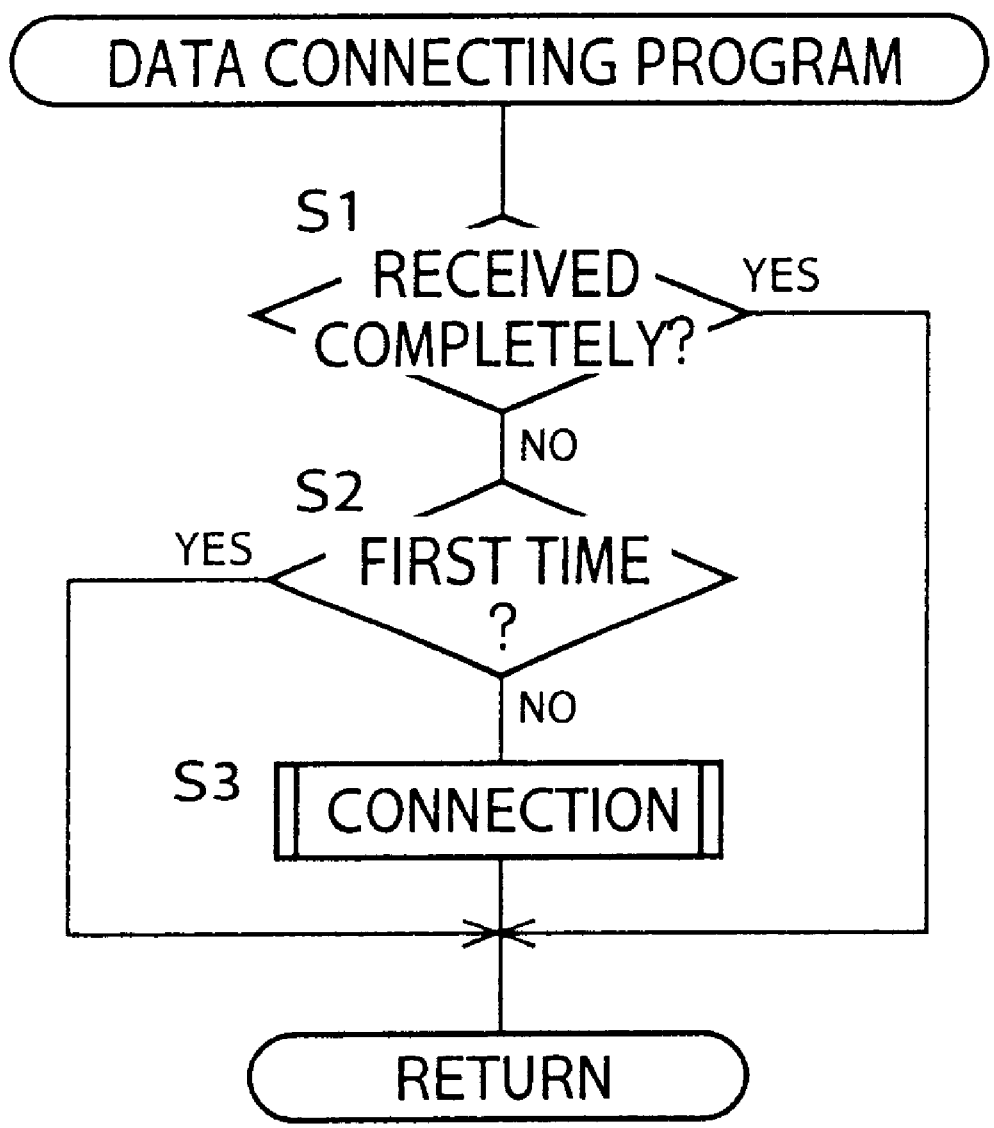
FIG. 5 is a flow chart illustrating a data connecting program which is stored in a ROM of the receiver of FIG. 1.

The two wheel data sets are connected with each other, with the controlling portion 26 of the receiver 22 executing the data connecting program illustrated in the flow chart of FIG. 5. This program is initiated with step S1 to determine whether each wheel data set has been completely received or not, by comparing an actually received volume of the wheel data set with a predetermined total volume of the wheel data set indicated by the TRAILER data, as described above. If a negative decision (NO) is obtained in step S1, the control flow goes to step S2 to determine whether the COMPLEMENTARY-RELATION flag data contained in the wheel data set in question are [1] or [0]. Where the COMPLEMENTARY-RELATION flag data arc [0], it indicates that the wheel data set in question does not have the above-described mutually complementary relation with the preceding wheel data set, namely, that the two successively supplied wheel data sets are not connectable with each other. Where the COMPLEMENTARY-RELATION flag data are [1], it indicates that the wheel data set in question is connectable with the preceding wheel data set so that the control flow goes to step S3 in which the wheel data set in question is connected with the preceding wheel data set.

FIG. 7 illustrates a pair of wheel data sets 100, 104 which are not connectable with each other, and another pair of wheel data sets 110, 114 which are connectable with each other. The wheel data set 100 includes COMPLEMENTARY-RELATION flag data 102 of [0]. This indicates that the wheel data set 100 is different in kind or data volume from the preceding wheel data set 104, and that the two wheel data sets 100, 104 are not connectable with each other. On the other hand, the wheel data set 110 includes COMPLEMENTARY-RELATION flag data 112 of [1]. This indicates that the wheel data set 110 is identical in kind or data volume with the preceding wheel data set 114, and that the two wheel data sets 110, 114 are connectable with each other.

For connecting these two wheel data sets 110, 114 with each other, a deficient data volume of the wheel data set 110 which volume has not been received by the receiver 22 is first calculated by subtracting an actually received data volume of the wheel data set 110 from a predetermined total data volume of the wheel data set 110 which volume is indicated by a TRAILER data X of the wheel data set 110. Then, a part of the preceding wheel data set 114, which part has a data volume corresponding to the calculated deficient data volume is transferred to the wheel data set 110. In the case illustrated in FIG. 7, the deficient data volume is m bit which corresponds to the data volume, of data "HIY", so that the data "HIY" are removed from the preceding wheel data set 114 and added to the wheel data set 110. Thus, the two wheel data sets 110, 114 cooperate with each other to form a complete wheel data set 116, which is read into the controlling portion 26 of the receiver 22.

It will be understood that the two wheel data sets 110, 114 can not be connected with each other where the deficient part (data "HIY") of the wheel data set 110 is not included either in the preceding wheel data set 114 even if the two wheel data sets 110, 114 are determined to have the mutually complementary relation with the COMPLEMENTARY-RELATION flag data of the wheel data set 110 being [1]. In other words, there are two conditions to be satisfied for the connection of the two wheel data sets. One of the two conditions is that the two wheel data sets are determined to have the mutually complementary relation. Another condition is that the two wheel data sets have been received in a state in which the two wheel data sets are connectable to each other.

As is clear from the above description, even where any one of the wheel data sets can not be completely received by the receiver 18, it is possible to obtain a complete wheel data set by connecting incomplete two wheel data sets which have been partially received by the receiver 18. Thus, complete wheel information is made available on the vehicle body, without waiting until the receiver 18 receives a complete one of the wheel data sets from the vehicle wheel information supply device.

Even where the reception ratio of each wheel data set is reduced with a reduction in the time period in which the wheel data sets can be received by the receiver 22, (for example, where the receiver 22 is held in the above-described intermittent receiving mode during non-activation of the driving device of the vehicle,) a complete wheel data set can be obtained by combining parts of two wheel data sets each of which has been partially received by the receiver 18.

Figure 8:
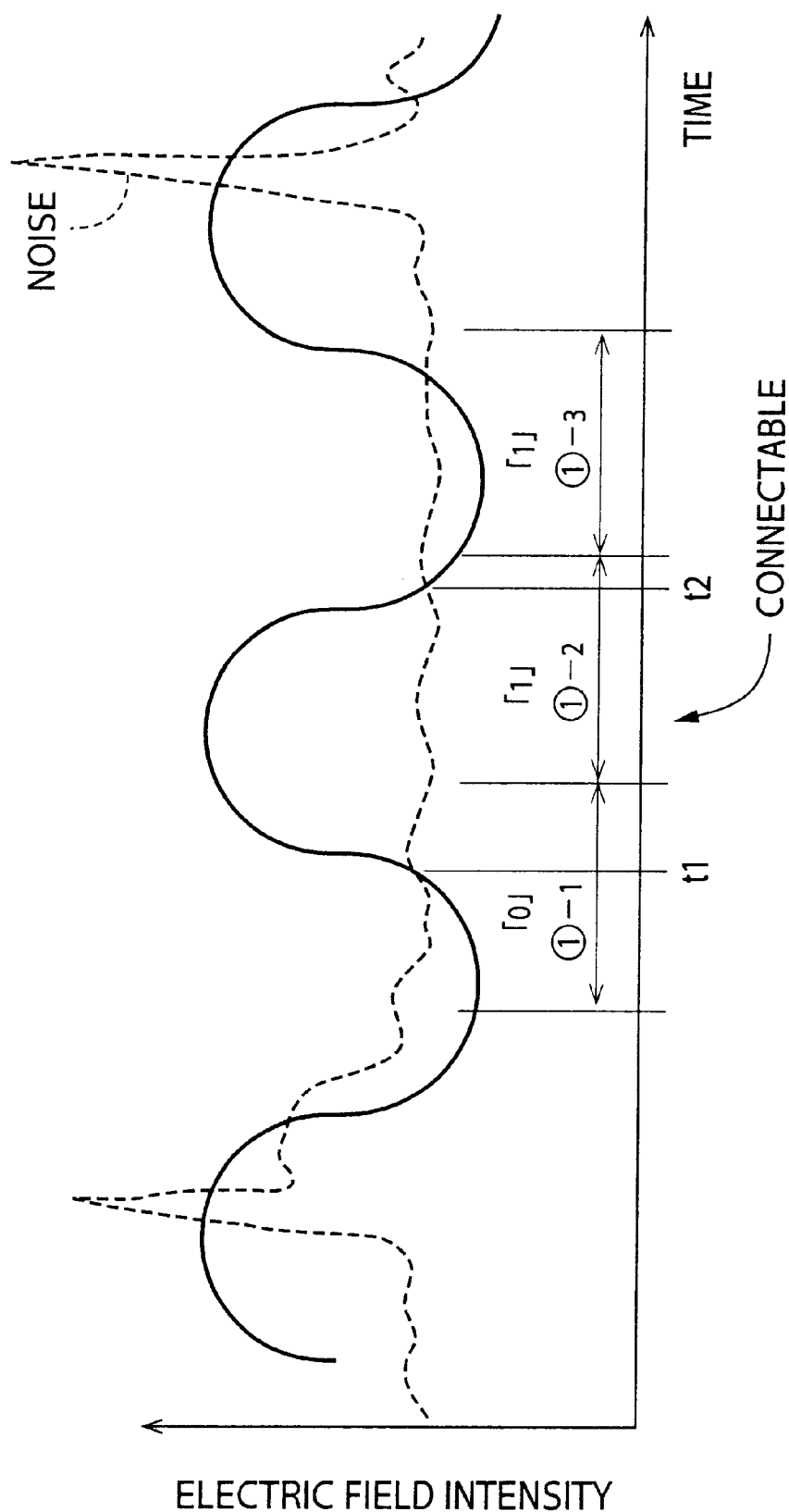
FIG. 8 is a view illustrating a condition in which the receiver of FIG. 1 receives the wheel information in the form of the wheel data sets.
Figure 9:
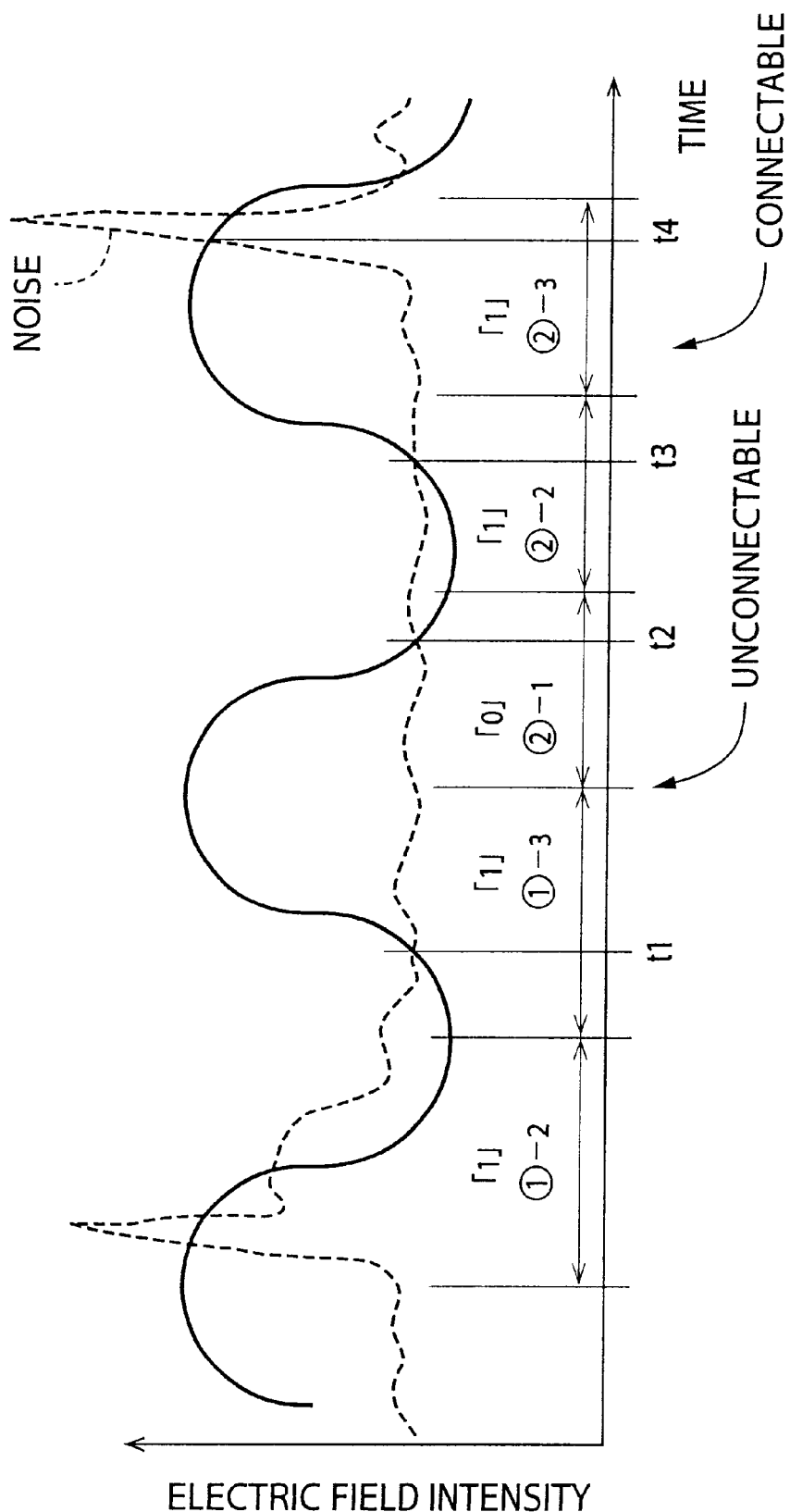
FIG. 9 is a view illustrating a condition in which the receiver of FIG. 1 receives the wheel information in the form of the wheel data sets.

Such an advantageous effect is obtained where the vehicle is running with the wheel being rotated, as well as where the vehicle is not running. For example, a wheel data set 1̂-1 (wheel data set 1̂ supplied for the first time) and a wheel data set 1̂-2 (wheel data set 1̂ supplied for the second time) in FIG. 8 can not be completely received by the receiver 22, since the transmission of the wheel data set 1̂-1 is started before a data-receivable time period t1–t2 in which the wheel data sets are receivable by the receiver 22, and the transmission of the wheel data set 1̂-2 is completed after the data-receivable time period t1–t2. However, a rear part of the wheel data set 1̂-1 and a front part of the wheel data set 1̂-2, which are received by the receiver 22 in the data-receivable time period t1–t2, can be combined into a complete wheel data set, which is then read into the controlling portion 26 of the receiver 22. In FIG. 9, a rear part of a wheel data set 1̂-3 and a front part of a wheel data set 1̂-1, which are received in a data-receivable time period t1–t2, are not combinable to each other, since the two wheel data sets 1̂-3, 2̂-1 are different in data volume or length from each other. However, a rear part of a wheel data set 2̂-2 and a front part of a wheel data set 2̂-3, which are received in a data-receivable time period t3–t4, can be combined into a complete wheel data set.

Each of the data-receivable time periods tends to be reduced with an increase in the rotating speed of the wheel. However, a complete wheel data set can be obtained as long as parts of respective two wheel data sets received in such a reduced data-receivable time period can complement each other, so that complete wheel information is made available without waiting until one of the wheel data sets is completely received by the receiver.

While the COMPLEMENTARY-RELATION flag data are provided in a front part of each wheel data set in the above-described embodiment, the flag data may be provided in a rear part of each wheel data set, so as to indicate whether the wheel data set have the mutually complementary relation with the following wheel data set which is supplied immediately after the wheel data set in question.

Referring to FIG. 10, there will be described a case where the COMPLEMENTARY-RELATION flag data are provided in the rear part of each wheel data set. Where each of the wheel data sets is successively transmitted a plurality of times (N times), the COMPLEMENTARY-RELATION flag data are set at [0] in the final transmission (N-th transmission) of each of the wheel data sets, and are set at [1] in each transmission before the final transmission.

A wheel data set 120 contains COMPLEMENTARY-RELATION flag data 122 of [0], which indicate that the wheel data set 120 is different in data volume or length from the following wheel data set 124. Since the two wheel data sets 122, 124 do not have the mutually complementary relation, the two wheel data sets 122, 124 can not be connected with each other. On the other band, a wheel data set 130 contains COMPLEMENTARY-RELATION flag data 132 of [1], which indicate that the wheel data set 130 is identical in data volume or length with the following wheel data set 134, and that the two wheel data sets 130, 134 are connectable with each other.

For connecting the two wheel data sets 130, 134 with each other, a deficient data volume of the wheel data set 134 is first calculated by subtracting an actually received data volume of the wheel data set 134 from a predetermined total data volume of the wheel data set 134 which volume is indicated by a TRAILER data X of the wheel data set 134. Then, a part of the wheel data set 130, which part has a data volume corresponding to the calculated deficient data volume is transferred to the wheel data set 134. In the case illustrated in FIG. 10, the deficient data volume is n bit which corresponds to the data volume of data "FG1Y", so that the data "FG1Y" are removed from the wheel data set 130 and added to the wheel data set 134. Thus, the two wheel data sets 130, 134 cooperate with each other to form a complete wheel data set 136, which is read into the controlling portion 26 of the receiver 22.

It is noted that the COMPLEMENTARY-RELATION flag data may be provided in an intermediate part of each wheel data set, or may be provided in each of the front and rear parts of each wheel data set.

Each wheel data set may includes DIVIDING-POSITION data which indicate division between the front part and the rear part of each wheel data set. The DIVIDING-POSITION data may further indicate whether two successively supplied sets of the wheel data sets are connectable with each other, for serving also as the COMPLEMENTARY-RELATION flag data.

Figure 11:
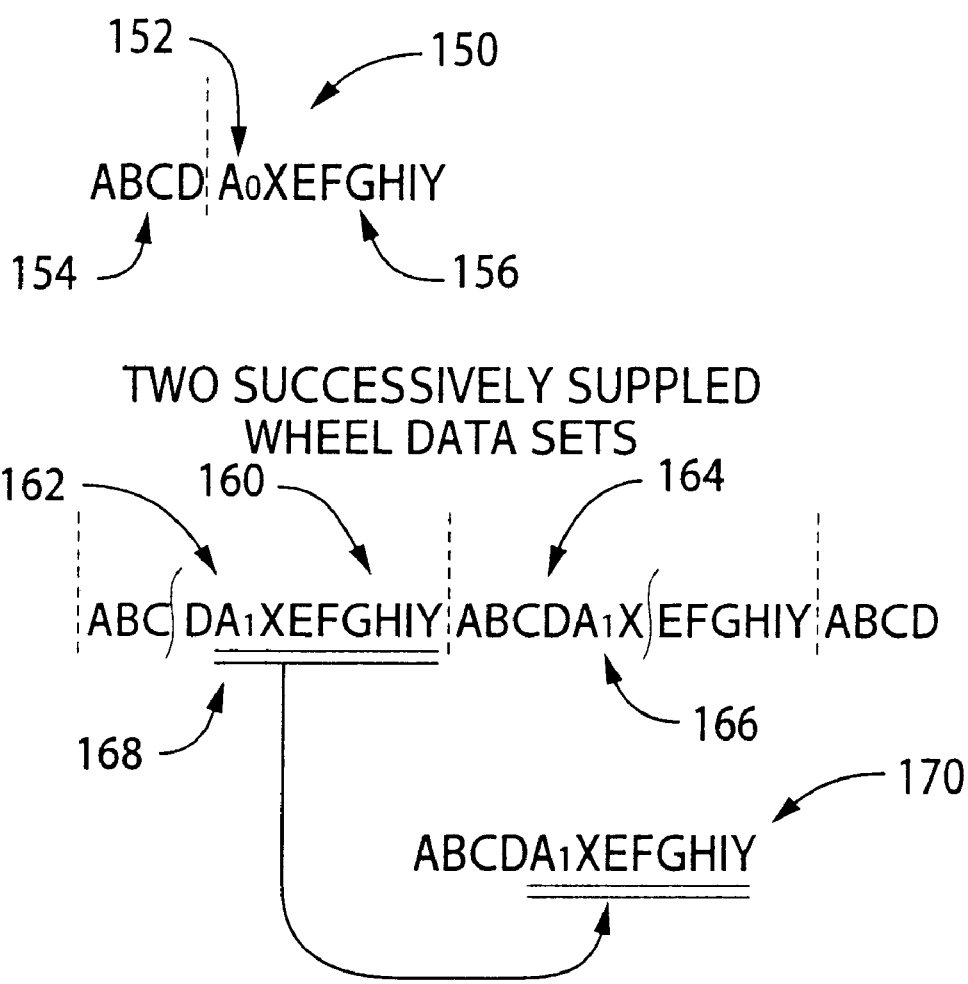
FIG. 11 is a view illustrating an operation of the receiver of FIG. 1, in which a rear part of one of two successively supplied wheel data sets and a front part of the other of the two successively supplied wheel data sets are combined into a complete wheel data set.

FIG. 11 shows wheel data sets each of which includes DIVIDING-POSITION data. DIVIDING-POSITION data 152 included in a wheel data set 150 indicate that the wheel data set 150 is divisible into a front part 154 which includes SYNCHRONIZATION data A and data B, C, D, and a rear part 156 which includes the DIVIDING-POSITION data 152 ($A_0$), TRAILER data X, data E, F, G, H, I and CHECK SUM data Y. The TRAILER data X indicate a predetermined total data volume of the rear part 156. The CHECK SUM data Y indicate a total data volume of the rear part 156 which has been transmitted by the transmitter 18, namely, indicate a total data volume of data which have been transmitted by the transmitter 18 after the transmission of the data D which had been transmitted immediately before the DIVIDING-POSITION data 152 ($A_0$).

DIVIDING-POSITION data 166 of a wheel data set 164 and DIVIDING-POSITION data 162 of the preceding wheel data set 160 have the same data $A_1$. This indicates that the two wheel data sets 160, 164 represent the wheel state at the same point of time and have the same data volume, and that the two wheel data sets 160, 164 are compatible with each other. That is, a part of one of the two wheel data sets 160, 164 can be replaced with the corresponding part of the other of the two wheel data sets 160, 164. Thus, an is incomplete rear part of the wheel data set 164 is replaced with a complete rear part 168 of the preceding wheel data set 160, for thereby forming a complete wheel data set 170.

It is noted that the DIVIDING-POSITION data have a particular pattern, as the SYNCHRONIZATION data. It is also noted that the DIVIDING-POSITION data may be provided in two or more position in each wheel data set.

While the IDENTIFICATION DATA 53, 63, 73 of the detailed wheel data set 40, the standard wheel data set 42 and the abridged wheel data set 44 have the same volume or length, the IDENTIFICATION DATA 53, 63, 73 may have respective different volumes. Where different IDENTIFICATION DATA whose volumes or lengths are different from each other are registered in the receiver 22, for example, the abridged wheel data set 44 may contain relatively small IDENTIFICATION DATA.

While the embodiment described above uses both of the air pressure detector 12 and the tire temperature detector 14, only one of these detectors 12, 14 may be used. Further, a detector for detecting the shape (deformation) of the wheel tire may be provided in place of, or in addition to the detectors 12, 14. That is, the wheel information may include information relating to the shape of the tire or the amount or condition of deformation of the tire, as well as information relating to the air pressure of the tire, information relating to the rate of reduction of the tire air pressure, and information relating to the tire temperature.

While the presently preferred embodiment of this invention have been described above, for illustrative purpose only, it is to be understood that the invention may be embodied with various changes, modifications and improvements, which may occur to those skilled in the art, in the light of the foregoing teachings including those described in the SUMMARY OF THE INVENTION.

What is claimed is:

1. A vehicle wheel information supply device disposed on a wheel of a vehicle and supplying wheel information representative of a state of the wheel, to a receiver disposed on a body of the vehicle, said vehicle wheel information supply device being capable of successively supplying a plurality of wheel data sets, as said wheel information, which represent the state of the wheel at the same point of time and which have respective data amounts that are different from each other, wherein said plurality of wheel data sets include common data relating to the state of the wheel, and wherein said vehicle wheel information supply device supplies said plurality of wheel data sets to said receiver in a predetermined order such that a wheel data set of said plurality of wheel data sets having a smallest data amount is supplied first and a remainder of said wheel data sets is supplied afterwards.

2. A vehicle information supply device according to claim 1, wherein said vehicle wheel information supply device supplies said wheel data sets to said receiver such that a wheel data set of said wheel data sets having a smaller data amount is supplied earlier than a wheel data set of said wheel data sets having a larger data amount.

3. A vehicle wheel information supply device according to claim 1, wherein each of said wheel data sets includes primary data indicative of the state of the wheel, and ancillary data.

4. A vehicle wheel information supply device disposed on a wheel of a vehicle and supplying wheel information representative of a state of the wheel, to a receiver disposed on a body of the vehicle, said vehicle wheel information supply device being capable of successively supplying a plurality of wheel data sets as said wheel information, wherein said plurality of wheel data sets include common data relating to the state of the wheel, and wherein said vehicle wheel information supply device supplies said plurality of wheel data sets to said receiver in a manner that makes possible a determination of whether two successively supplied wheel data sets have a mutually complementary relation for cooperating with each other to form, as a substitute for the two successively supplied wheel data sets, a wheel data set constituted by parts of the two successively supplied sets.

5. A vehicle wheel information supply device according to claim 4, wherein each of said wheel data sets supplied by said vehicle wheel information supply device includes complementary-relation-indication data indicative of whether the two successively supplied sets of said wheel data sets have said mutually complementary relation.

6. A vehicle wheel information supply device according to claim 4, comprising: a wheel state detector which detects the state of the wheel; a wheel information generator which generates said wheel data sets on the basis of an output of said wheel state detector; and a transmitter which transmits said wheel data sets to said receiver, wherein each of said wheel data sets generated by said wheel information generator includes complementary-relation-indication data indicative of whether the two successively supplied sets of said wheel data sets have said mutually complementary relation.

7. A vehicle information supply device according to claim 4, further comprising: a wheel state detector which detects the state of the wheel; a wheel information generator which generates said wheel data sets on the basis of an output of said wheel state detector; and a transmitter which transmits said wheel data sets to said receiver in a manner that makes possible a determination of whether the two successively supplied sets of said wheel data sets have said mutually complementary relation.

8. A vehicle wheel information supply device according to claim 7, wherein said transmitter adds complementary-relation-indication data to each of said wheel data sets generated by said wheel information generator before transmitting said wheel data sets to said receiver, said complementary-relation-indication data added by said transmitter being indicative of whether the two successively supplied sets of said wheel data sets have said mutually complementary relation.

9. A vehicle wheel information supply device according to claim 4, supplying said plurality of wheel data sets to said receiver in a manner that makes possible a determination of whether two successively supplied sets of said wheel data sets represent the state of the wheel at the same point of time.

10. A vehicle wheel information supply device according to claim 4, supplying said plurality of wheel data sets to said receiver in a manner that makes possible a determination of whether two successively supplied sets of wheel data sets have the same data amount.

11. A vehicle wheel information supply device according to claim 4, further comprising at least one of a first information supplier and a second information supplier, said first information supplier supplying said plurality of wheel data sets to said receiver in a manner that makes possible a determination of whether each of said wheel data sets and a preceding one of said wheel data sets which is supplied immediately before said each wheel data set have said mutually complementary relation, said second information supplier supplying said plurality of wheel data sets to said receiver in a manner that makes possible a determination of whether each of said wheel data sets and a following one of said wheel data sets which is supplied immediately after said each wheel data set have said mutually complementary relation.

12. A vehicle wheel information supply device according to claim 11, wherein each of said wheel data sets includes first complementary-relation-indication data indicative of whether said each of said wheel data sets and said preceding one of said wheel data sets have said mutually complementary relation, where said wheel data sets are supplied by said first information supplier, and wherein each of said wheel data sets includes second complementary-relation-indication data indicative of whether said each of said wheel data sets and said following one of said wheel data sets have said mutually complementary relation, where said wheel data sets are supplied by said second information supplier.

13. A vehicle wheel information supply device according to claim 4, comprising: a wheel state detector which detects the state of the wheel; a wheel information generator which generates said wheel data sets on the basis of an output of said wheel state detector; and a transmitter which transmits said wheel data sets to said receiver, wherein said wheel information generator includes at least one of a first generating portion and a second generating portion, said first information generating portion generating said wheel data sets such that each of said wheel data sets includes first complementary-relation-indication data indicative of whether said each of said wheel data sets and a preceding one of said wheel data sets which is supplied immediately before said each wheel data set have said mutually complementary relation, said second information generating portion generating said wheel data sets such that each of said wheel data sets includes second complementary-relation-indication data indicative of whether said each of said wheel data sets and a following one of said wheel data sets which is supplied immediately after said each wheel data set have said mutually complementary relation.

14. A vehicle wheel information supply device according to claim 13, wherein said first complementary-relation-indication data are located in a front part of said each wheel data set, and wherein said second complementary-relation-indication data are located in a rear part of said each wheel data set which is received, later than said front part, by said receiver.

15. A vehicle wheel information supply device according to claim 4, further comprising a wheel state detector which detects the state of the wheel; a wheel information generator which generates said wheel data sets on the basis of an output of said wheel state detector; and a transmitter which transmits said wheel data sets to said receiver, wherein said transmitter includes at least one of a first transmitting portion and a second transmitting portion, said first transmitting portion transmitting said plurality of wheel data sets to said receiver in a manner that makes possible a determination of whether each of said wheel data sets and a preceding one of said wheel data sets which is supplied immediately before said each wheel data set have said mutually complementary relation, said second transmitting portion transmitting said plurality of wheel data sets to said receiver in a manner that makes possible a determination of whether each of said wheel data sets and a following one of said wheel data sets which is supplied immediately after said each wheel data set have said mutually complementary relation.

16. A vehicle wheel information supply device according to claim 4, wherein each of said wheel data sets includes amount-indication data indicative of a predetermined total data amount of said each of said wheel data sets.

17. A vehicle wheel information supply device according to claim 4, wherein each of said wheel data sets includes dividing-position-indication data indicating division between a front part and a rear part of each said wheel data sets, so that said wheel data set is constituted by said rear part of one of the two successively supplied sets of said wheel data sets and said front part of the other of said two successively supplied sets of said wheel data sets, where the two successively supplied sets of said wheel data sets have said mutually complementary relation.

18. A vehicle wheel information supply device according to claim 17, wherein said dividing-position-indication data further indicate whether the two successively supplied sets of said wheel data sets have said mutually complementary relation.

19. A vehicle wheel information supply device according to claim 4, comprising: a wheel state detector which detects the state of the wheel; a wheel information generator which generates said wheel data sets on the basis of an output of said wheel state detector; and a transmitter which transmits said wheel data sets to said receiver, wherein said wheel state detector includes at least one of an air pressure detecting portion which detects an air pressure in a tire of the wheel and a tire temperature detecting portion which detects a temperature of the tire.

20. A vehicle wheel information supply device according to claim 4, comprising: a wheel state detector which detects the state of the wheel; a wheel information generator which generates said wheel data sets on the basis of an output of said wheel state detector; a transmitter which transmits said wheel data sets to said receiver; and an information supply controller which controls at least one of said wheel information generator and said transmitter on the basis of the state of the wheel detected by said wheel state detector, for thereby controlling a condition in which said wheel information is supplied.

21. A vehicle wheel information supply and receive apparatus comprising:
a receiver disposed on a body of the vehicle; and
a vehicle wheel information supply device disposed on a wheel of a vehicle and supplying wheel information representative of a state of the wheel, to said receiver, said vehicle wheel information supply device being capable of successively supplying a plurality of wheel data sets, as said wheel information, which represent the state of the wheel at the same point of time and which have respective data amounts that are different from each other, wherein said plurality of wheel data sets include common data relating to the state of the wheel, and wherein said vehicle wheel information supply device supplies said plurality of wheel data sets to said receiver in a predetermined order such that a wheel data set of said plurality of wheel data sets having a smallest data amount is supplied first and a remainder of said wheel data sets is supplied afterwards, and wherein said receiver receives said wheel information supplied from said vehicle wheel information supply device.

22. A vehicle wheel information supply and receive apparatus according to claim 21, wherein said receiver is held in an intermittent receiving mode in which a receivable state and an unreceivable state are alternately established so that said wheel information can be received by said receiver at a predetermined time interval, when the vehicle is not allowed to run.

23. A vehicle wheel information supply and receive apparatus comprising:

a receiver disposed on a body of a vehicle; and a vehicle wheel information supply device disposed on a wheel of the vehicle and supplying wheel information representative of a state of the wheel to said receiver, said vehicle wheel information supply device being capable of successively supplying a plurality of wheel data sets as said wheel information, wherein said plurality of wheel data sets include common data relating to the state of the wheel, wherein said vehicle wheel information supply device supplies said plurality of wheel data sets to said receiver in a manner that makes possible a determination of whether two successively supplied wheel data sets have a mutually complementary relation for cooperating with each other to form, as a substitute for the two successively supplied wheel data sets, a wheel data set constituted by parts of the two successively supplied sets, and wherein said receiver receives said wheel data sets supplied from said vehicle wheel information supply device, said receiver including a data connecting portion which connects said parts of the respective two successively supplied sets of said wheel data sets where the two successively supplied sets have said mutually complementary relation.

24. A vehicle wheel information indicating system comprising: a vehicle wheel information supply and receive apparatus including (a) a receiver disposed on a body of a vehicle, and (b) a vehicle wheel information supply device disposed on a wheel of the vehicle and supplying wheel information representative of a state of the wheel to said receiver, said vehicle wheel information supply device being capable of successively supplying a plurality of wheel data sets, as said wheel information, which represent the state of the wheel at the same point of time and which have respective data amounts that are different from each other; and an indicator which provides a driver of the vehicle with an indication of the state of the wheel based on said wheel information received by said receiver, wherein said plurality of wheel data sets include common data relating to the state of the wheel, wherein said vehicle wheel information supply device supplies said plurality of wheel data sets to said receiver in a predetermined order such that a wheel data set of said plurality of wheel data sets having a smallest data amount is supplied first and a remainder of said wheel data sets is supplied afterwards and wherein said receiver receives said wheel information supplied from said vehicle wheel information supply device.

* * * * *